US010505881B2

(12) United States Patent
Bray et al.

(10) Patent No.: US 10,505,881 B2
(45) Date of Patent: Dec. 10, 2019

(54) GENERATING MESSAGE ENVELOPES FOR HETEROGENEOUS EVENTS

(71) Applicant: Amazon Technologies, Inc., Seattle, WA (US)

(72) Inventors: Timothy William Bray, Vancouver (CA); Marvin Michael Theimer, Seattle, WA (US); Mustafa Ugur Torun, Seattle, WA (US); Curt Richards Carpenter, Kirkland, WA (US); Sing Yoong Khew, Kirkland, WA (US); Mihir Rajendrabhai Patel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 427 days.

(21) Appl. No.: 14/863,349

(22) Filed: Sep. 23, 2015

(65) Prior Publication Data

US 2017/0085512 A1 Mar. 23, 2017

(51) Int. Cl.
*H04L 12/58* (2006.01)

(52) U.S. Cl.
CPC .............. *H04L 51/22* (2013.01); *H04L 51/14* (2013.01)

(58) Field of Classification Search
CPC .......... G07B 2017/00072; H04L 67/24; H04L 67/26; H04L 2209/60; H04L 51/14; H04L 41/04; H04L 51/066; H04L 63/0236; H04L 12/1432; H04L 29/08099; H04L 43/08; H04L 43/10; H04L 67/1097;
(Continued)

(56) References Cited

U.S. PATENT DOCUMENTS 4,766,604 A    8/1988   Axberg
6,088,717 A *  7/2000   Reed ...................... H04L 29/06
                                                    707/999.01
(Continued)

OTHER PUBLICATIONS

U.S. Appl. No. 14/529,096, filed Oct. 30, 2014, Mihir Rajendrabhai Patel et al.

(Continued)

*Primary Examiner* — Jason D Recek
*Assistant Examiner* — Ranjan Pant
(74) *Attorney, Agent, or Firm* — Robert C. Kowert; Meyertons, Hood, Kivlin, Kowert & Goetzel, P.C.

(57) ABSTRACT

Methods, systems, and computer-readable media for generating message envelopes for heterogeneous events are disclosed. A plurality of events are received. The events are associated with computing resources in a multi-tenant environment. The events comprise an event formatted using a content schema and a different event formatted using a different content schema. A message is generated comprising a message envelope and the event. The message envelope comprises a plurality of field names and one or more field values formatted using an envelope schema. A different message is generated comprising a different message envelope and the different event. The different message envelope comprises the field names and one or more different field values formatted using the envelope schema. The message is filtered based at least in part on the message envelope, and the different message is filtered based at least in part on the different message envelope.

20 Claims, 20 Drawing Sheets

(58) Field of Classification Search
CPC ............ H04M 1/72572; G06F 17/3089; G06F 9/542; G06F 17/30525; G06F 17/30867; G06F 17/30876; H04N 21/454; H04N 21/4622; H04W 28/02; H04W 4/12; H04W 84/04; H04W 24/08

See application file for complete search history.

(56) References Cited

U.S. PATENT DOCUMENTS

| | | | | |
|---|---|---|---|---|
| 6,418,202 | B1 | 7/2002 | Caldwell et al. | |
| 7,664,867 | B2 | 2/2010 | Lockhart, Jr. | |
| 7,747,558 | B2 | 6/2010 | Martinez Smith et al. | |
| 7,886,001 | B2 | 2/2011 | Asthana et al. | |
| 7,962,633 | B1* | 6/2011 | Sidebottom | G06Q 10/10 709/223 |
| 7,991,778 | B2 | 8/2011 | Hull et al. | |
| 8,060,546 | B2 | 11/2011 | Law et al. | |
| 8,086,560 | B2 | 12/2011 | Hernandez-Sherrington et al. | |
| 8,239,426 | B2 | 8/2012 | Rangadass et al. | |
| 8,281,408 | B2 | 10/2012 | Corndorf | |
| 8,291,453 | B2 | 10/2012 | Boortz | |
| 8,484,185 | B2 | 7/2013 | Fra' et al. | |
| 8,577,927 | B2 | 11/2013 | Fabret et al. | |
| 8,665,911 | B2 | 3/2014 | Law et al. | |
| 8,719,605 | B2 | 5/2014 | Chakra et al. | |
| 8,775,457 | B2 | 7/2014 | Schneider | |
| 8,782,184 | B2 | 7/2014 | Furlong et al. | |
| 9,059,899 | B2 | 6/2015 | Natarajan et al. | |
| 9,146,764 | B1* | 9/2015 | Wagner | G06F 9/45533 |
| 9,603,058 | B2* | 3/2017 | Delsesto | H04L 29/12896 |
| 9,774,495 | B1* | 9/2017 | Okita | H04L 41/0803 |
| 2005/0114487 | A1* | 5/2005 | Peng | G06F 16/958 709/223 |
| 2006/0190591 | A1* | 8/2006 | Bobde | G06Q 10/107 709/224 |
| 2007/0180043 | A1* | 8/2007 | Vernal | G06F 9/465 709/207 |
| 2007/0208870 | A1* | 9/2007 | Lockhart, Jr. | H04L 67/02 709/230 |
| 2008/0059577 | A1* | 3/2008 | Kalia | G06Q 10/10 709/204 |
| 2008/0109884 | A1* | 5/2008 | Kulkarni | G06F 21/31 726/5 |
| 2008/0256124 | A1* | 10/2008 | Hernandez-Sherrington | G06F 17/218 |
| 2009/0177727 | A1* | 7/2009 | Radia | G06F 9/5044 709/201 |
| 2010/0037088 | A1* | 2/2010 | Krivopaltsev | H04L 41/0681 714/4.1 |
| 2011/0145301 | A1* | 6/2011 | Fabret | G06F 16/256 707/803 |
| 2011/0145836 | A1* | 6/2011 | Wheeler | G06F 9/546 719/314 |
| 2011/0225306 | A1* | 9/2011 | Delsesto | H04L 29/12896 709/227 |
| 2011/0258638 | A1 | 10/2011 | Davies et al. | |
| 2011/0296185 | A1 | 12/2011 | Kamarthy et al. | |
| 2013/0041958 | A1 | 2/2013 | Post et al. | |
| 2014/0046908 | A1* | 2/2014 | Patiejunas | G06F 16/113 707/687 |
| 2014/0074826 | A1 | 3/2014 | Cooper et al. | |
| 2014/0244714 | A1* | 8/2014 | Heiby | H04L 51/24 709/203 |
| 2014/0289391 | A1* | 9/2014 | Balaji | H04L 43/04 709/224 |
| 2016/0179598 | A1* | 6/2016 | Lvin | G06F 11/079 714/48 |
| 2016/0380936 | A1* | 12/2016 | Gunasekara | G06Q 10/107 709/206 |
| 2017/0193017 | A1* | 7/2017 | Migliori | G06F 16/1724 |

OTHER PUBLICATIONS

U.S. Appl. No. 14/529,097, filed Oct. 30, 2014, Mihir Rajendrabhai Patel, et al.

Brad Chacos, "How to Use IFTTT to Automate your Online Life", Jul. 18, 2013, pp. 1-11.

U.S. Appl. No. 14/847,962, filed Sep. 8, 2015, Timothy William Bray.

U.S. Appl. No. 14/853,884, filed Sep. 14, 2015, Timothy William Bray, et al.

* cited by examiner

GENERATING MESSAGE ENVELOPES FOR HETEROGENEOUS EVENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. When customers access such facilities remotely, the facilities may be said to reside "in the cloud" and may represent cloud computing resources.

As the scale and scope of distributed systems have increased, the tasks of provisioning, administering, and managing the resources have become increasingly complicated. For example, maintenance is often necessary when problems arise with various components of distributed systems. System administrators have often performed such maintenance tasks in a manual and ad hoc manner. When maintenance tasks are performed manually, the results may be unnecessarily expensive and prone to error. Additionally, system administrators may be required to develop and deploy custom systems for performing maintenance tasks.

Figure 1:
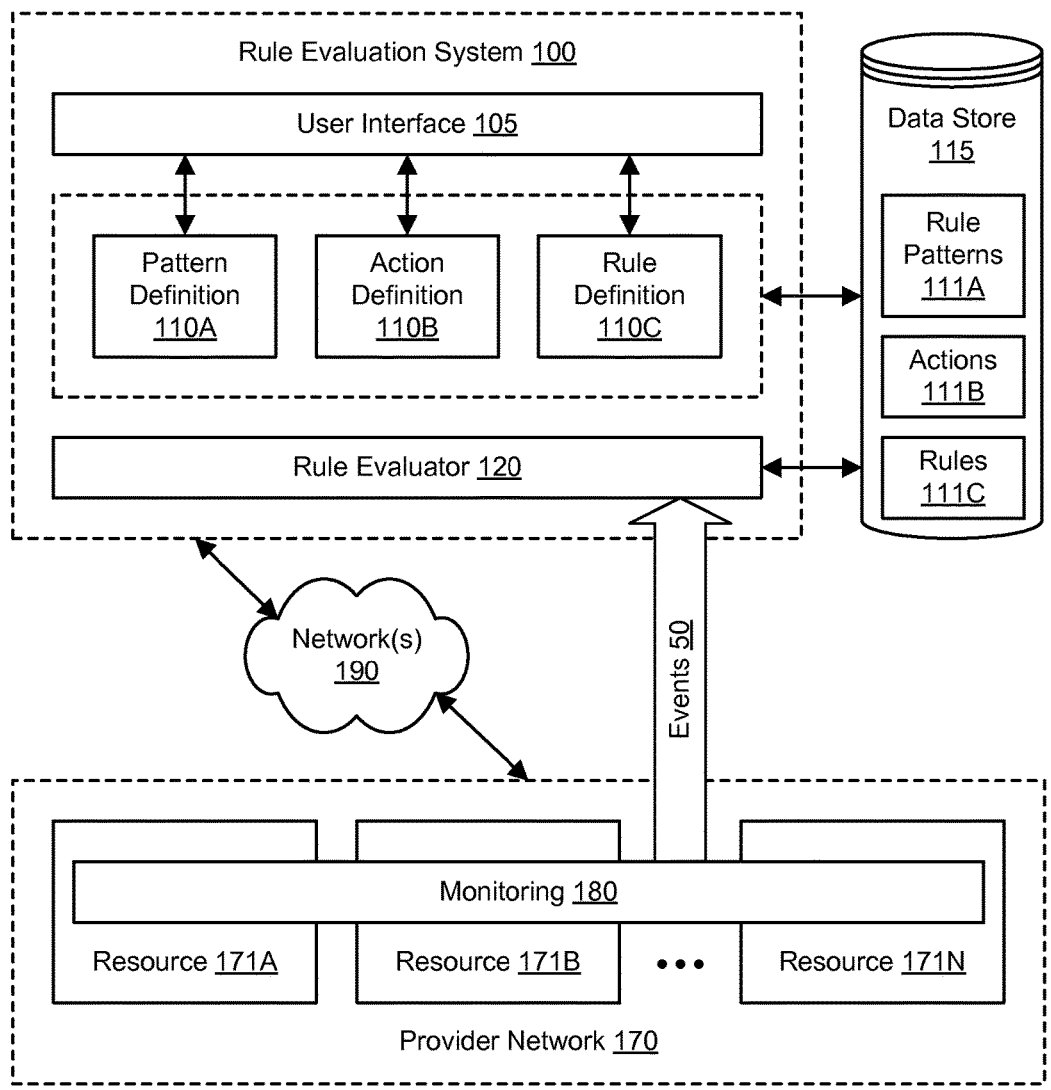
FIG. 1 illustrates an example system environment for rule evaluation in a provider network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for generating message envelopes for heterogeneous events are disclosed. Using the techniques described herein, events may be received that describe resources, such as changes to the resources or the status of the resources, in a provider network. The events may vary in content and format, such that different events may be formatted using different content schemas. The events may be received from a plurality of different services using an application programming interface (API) for an envelope service. The envelope service may create envelopes for messages that describe the heterogeneous events using an envelope schema that represents a common, standardized format. By using the same envelope schema for the heterogeneous events, the envelopes may share the same set of field names regardless of the differing field names in the events. Messages may be subjected to rule pattern matching against fields in the envelopes and/or delivered to various recipients. In this manner, the processing of messages describing heterogeneous events may be facilitated.

The use of a standardized format for message envelopes for events may be useful in implementing efficient event-driven computing, e.g., computation in response to recently occurring events. When a standardized message envelope is used for events, different types of recipients across a distributed system may use the same type of component (e.g., an envelope parser) to decode event metadata in a consistent, predictable manner and then take further action based on the decoded metadata. As one example of an event recipient, a rule evaluator may receive events with message envelopes in the standardized format and attempt to match the fields in the message envelopes against rule patterns. Because the same fields are included in the standardized message envelopes, the rule patterns may be used to filter a broad range of events and not only events with event-specific, resource-specific, or service-specific fields.

Rule Evaluation in a Provider Network

FIG. 1 illustrates an example system environment for rule evaluation in a provider network, according to some embodiments. A rule evaluation system 100 may include a plurality of components for evaluating rules and/or performing actions based on rules. In one embodiment, the rule evaluation system 100 may include a pattern definition functionality 110A, an action definition functionality 110B, and a rule definition functionality 110C. A data store 115 may store information associated with rule patterns 111A, actions 111B, and rules 111C defined using the pattern definition functionality 110A, action definition functionality 110B, and/or rule definition functionality 110C. The data store 115 may be implemented using any suitable storage technologies, such as database management technologies.

The rule evaluation system 100 may also include a user interface 105. In one embodiment, the user interface 105 may enable a user to define and/or select rule patterns 111A, actions 111B, and/or rules 111C using the pattern definition functionality 110A, action definition functionality 110B, and/or rule definition functionality 110C. For example, the user interface 105 may permit a user to select one or more predefined rule patterns and/or define one or more custom rule patterns. Similarly, the user interface 105 may permit a user to select one or more predefined actions and/or define one or more custom actions. The user interface 105 may permit a user to define one or more rules. In one embodiment, a rule may be defined to include one or more rule patterns and one or more actions. In one embodiment, a rule may be defined to include a rule pattern and a message exchange. Definitions of rule patterns 111A, actions 111B, and rules 111C are discussed in greater detail below with respect to FIG. 3.

Figure 19:
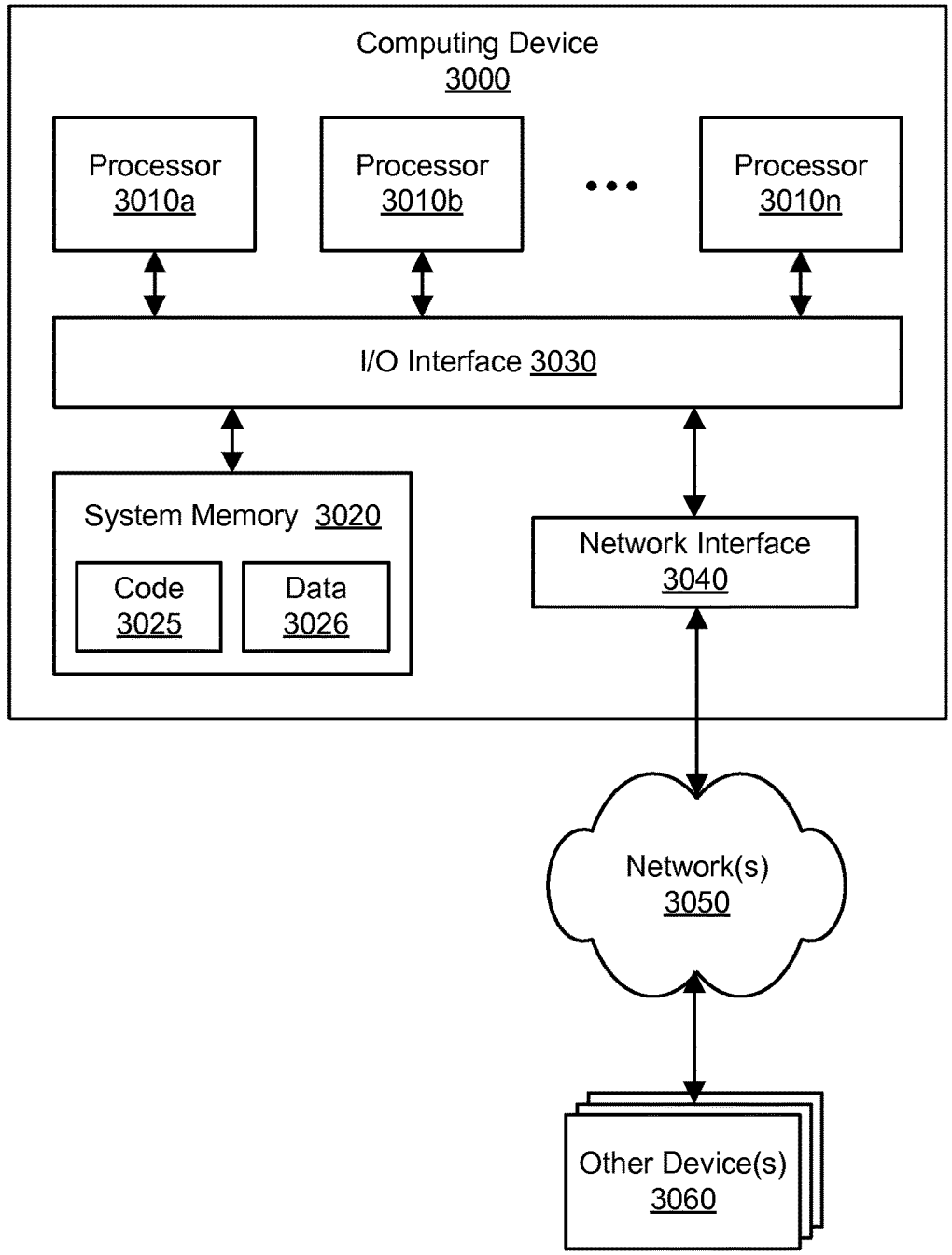
FIG. 19 illustrates an example of a computing device that may be used in some embodiments.

The rule evaluation system 100 may be implemented using one or more computing devices, any of which may be implemented by the example computing device 3000 illustrated in FIG. 19. In various embodiments, portions of the functionality of the rule evaluation system 100 may be provided by the same computing device or by any suitable number of different computing devices. If any of the components of the rule evaluation system 100 are implemented using different computing devices, then the components and their respective computing devices may be communicatively coupled, e.g., via a network. Each of the illustrated components may represent any combination of software and hardware usable to perform their respective functions. It is contemplated that the rule evaluation system 100 may include additional components not shown, fewer components than shown, or different combinations, configurations, or quantities of the components shown.

The rule evaluation system 100 may be coupled to a provider network 170 using one or more networks 190 or other interconnects. The provider network 170 may include a plurality of computing resources such as computing resources 171A and 171B through 171N. The resources 171A-171N may include any suitable number and configuration of compute instances and/or other processing resources, storage resources, database resources, network resources, power resources, and/or other suitable types of computing resources. Although three computing resources 171A, 171B, and 171N are shown for purposes of illustration, it is contemplated that any suitable number and configuration of computing resources may be used. The provider network 170 may include the sources of events 50 that can match rule patterns, the targets of actions, and/or one or more action handlers that perform actions.

The provider network 170 may be operated by an entity such as a company or a public sector organization to provide resources (such as resources 171A-171N) and/or services (such as various types of cloud-based computing or storage) to a distributed set of clients via the Internet and/or other networks. The provider network 170 may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 170 in different embodiments, including computer servers, storage devices, network devices, and the like.

In one embodiment, the provider network 170 may implement a flexible set of resource reservation, control, and access interfaces for clients. For example, the provider network 170 may implement a programmatic resource reservation interface (e.g., via a web site or a set of web pages) that allows clients to learn about, select, purchase access to, and/or reserve resources. In one embodiment, resources may be reserved on behalf of clients using a client-accessible service. In one embodiment, the provider network 170 may execute tasks on behalf of clients using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client.

The provider network 170 may also include a monitoring functionality 180. The monitoring functionality 180 may monitor any of the resources, e.g., during operation and/or use of the resources. The monitoring functionality 180 may use agent software or any other suitable techniques to monitor individual resources. In one embodiment, monitoring the resources in the provider network may include monitoring one or more service logs, monitoring one or more service metrics, and/or monitoring any suitable data streams. In one embodiment, the monitoring may compare performance metrics, usage metrics, and/or other suitable data relating to the operation of the resources 171A-171N to predetermined thresholds and/or alarms. Any suitable predetermined thresholds and/or alarms may represent one or more conditions for satisfying a particular rule pattern.

In one embodiment, the monitoring functionality 180 may generate events 50 that describe resources changes in the provider network 170, and the monitoring functionality may send the events to the rule evaluation system 100 to determine which of the events (if any) match the rule patterns 111A. In one embodiment, when the monitoring of the computing resources indicates that a particular type of state change has occurred in a resource, the monitoring functionality 180 may generate one or more of the events 50. The monitoring functionality 180 may generate at least some of the events 50 based on thresholds and/or alarms. For example, the monitoring functionality 180 may detect an alarm state change and may generate an event as a result. In one embodiment, external agents may implement the monitoring functionality 180 and generate the events 50. In one embodiment, services within the provider network 170 may implement the monitoring functionality 180 and generate the events 50.

In one embodiment, the rule evaluation system 100 may include a rule evaluator 120. The rule evaluator 120 may receive events 50 and determine which of the events match which of the rule patterns 111A. In one embodiment, the rule evaluator 120 may analyze event metadata, such as a message envelope for a message that encapsulates an event, in order to determine potential matches. When a rule pattern is matched, the rule evaluator 120 may determine which rules 111C include the rule pattern. To determine which rules include the rule pattern, the rule evaluator 120 may refer to the stored rules 111C, rule patterns 111A, and/or other appropriate data in the data store 115. After retrieving any rules that include the matched rule pattern, the rule evaluator 120 may determine any actions defined in the retrieved rules. The rule evaluator 120 may then initiate any actions defined in the retrieved rules or otherwise cause the actions to be performed. When initiating actions, the rule evaluator 120 may supply various types of input, metadata, or parameters for the actions, e.g., as found in events that match rule patterns. In this manner, the rule evaluation system 100 may use defined rules to perform particular actions when particular rule patterns are matched activated.

Figure 2:
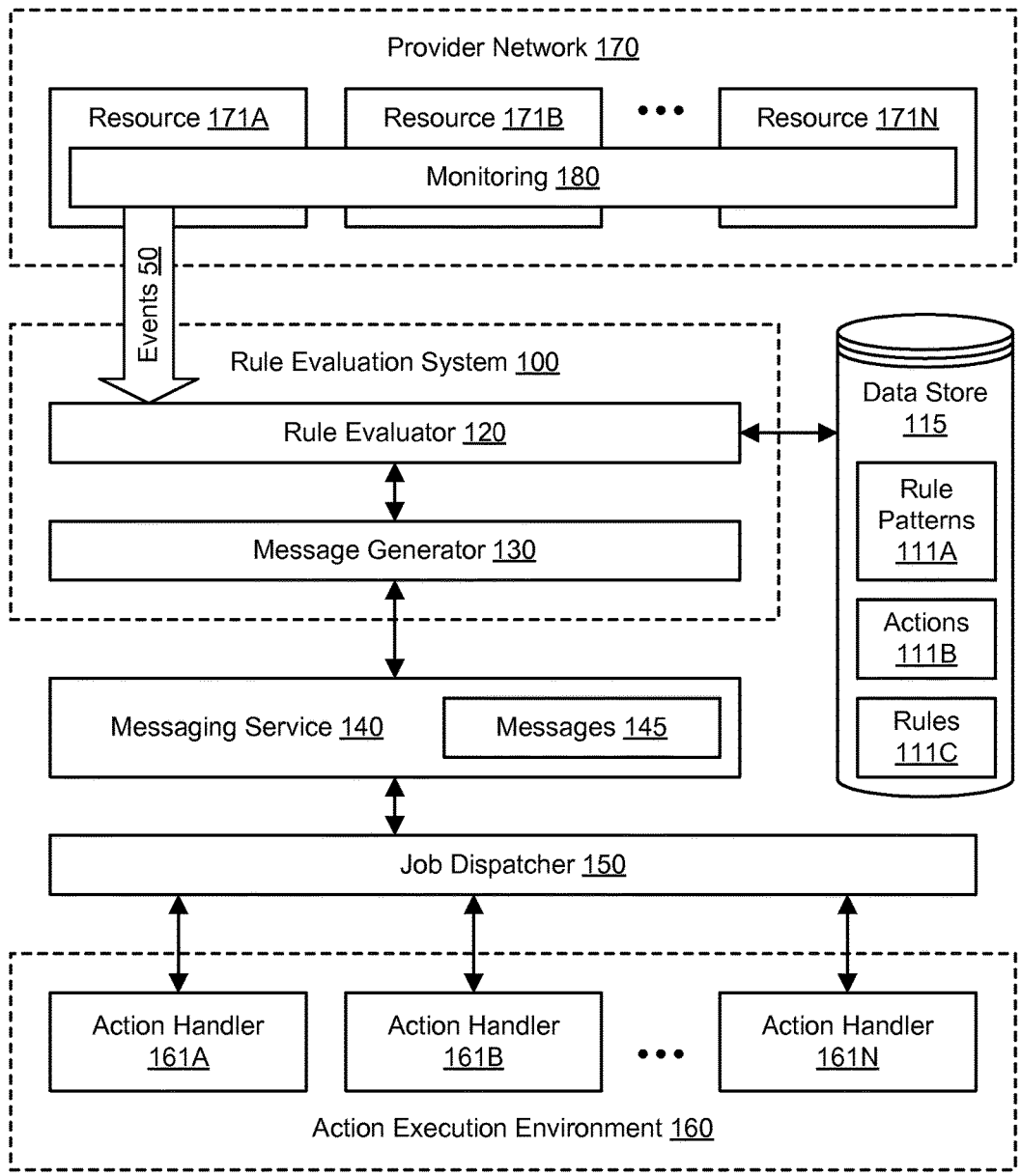
FIG. 2 illustrates further aspects of the example system environment for rule evaluation in a provider network, according to some embodiments.

FIG. 2 illustrates further aspects of the example system environment for rule evaluation in a provider network, according to some embodiments. The rule evaluation system 100 may include a message generator 130. When invoked by the rule evaluator 120, the message generator 130 may generate messages 145 that describe actions to be performed, e.g., when rule patterns associated with the actions are matched. The message generator 130 may send the messages 145 to a messaging service 140. The messages may be generated based on run-time input parameters supplied with any matched rule patterns and/or default parameters associated with actions. In one embodiment, a job dispatcher 150 may interact with the messaging service 140 to dispatch jobs based on the messages 145.

In one embodiment, an action execution environment 160 may perform the actions described in the messages 145 and dispatched by the job dispatcher 150. The action execution environment 160 may include one or more environments for executing instructions, including scripts, workflows, and/or compiled program code. The action execution environment 160 may include one or more action handlers, such as action handlers 161A and 161B through 161N. Although three action handlers 161A, 161B, and 161N are shown for purposes of illustration, it is contemplated that any suitable number of action handlers may be used. The actions performed by the action handlers 161A-161N may include any suitable modification and/or configuration of any of the resources 171A-171N and/or their constituent elements. For example, the actions may automatically terminate, suspend, or restart a compute instance in the provider network 170 when a particular rule pattern is matched. As another example, an action may be performed to automatically resize an image file to a predefined width and predefined height when the image file is added to a particular storage location, directory, or bucket. An action may be performed by an action handler based on a rule pattern being matched, based on a schedule, or based on a request from a user or other computing component.

In one embodiment, the rule evaluation system 100 may include a recommendation engine. The recommendation engine may use machine learning techniques to recommend automations to the customers based on customer resource usage patterns and/or resource metadata. The recommendation engine may also adapt to customer reaction and improve the recommendations over time. The recommendations may be improved using a feedback loop with input from customers and popular trends in the rule evaluation system 100.

In one embodiment, the messaging service 140 may be implemented using a queue service that manages one or more queues. Messages 145 describing actions to be performed may be sent to the messaging service or placed in the one or more queues. In one embodiment, one queue represent be a primary queue that initially stores all the messages generated by the message generator 130, and other queues may be used as backup queues if the primary queue is insufficient to handle all the messages. In one embodiment, the job dispatcher 150 may be implemented using a task poller. The task poller may poll the one or more queues at a suitable interval to determine whether the queues include messages, e.g., messages describing actions to be performed. The task poller may initiate the use of the backup queues upon receiving an appropriate error message from the primary queue. The task poller may poll each of the various queues at particular intervals. In one embodiment, the task poller may poll the primary queue more frequently than the backup queues.

Figure 3:
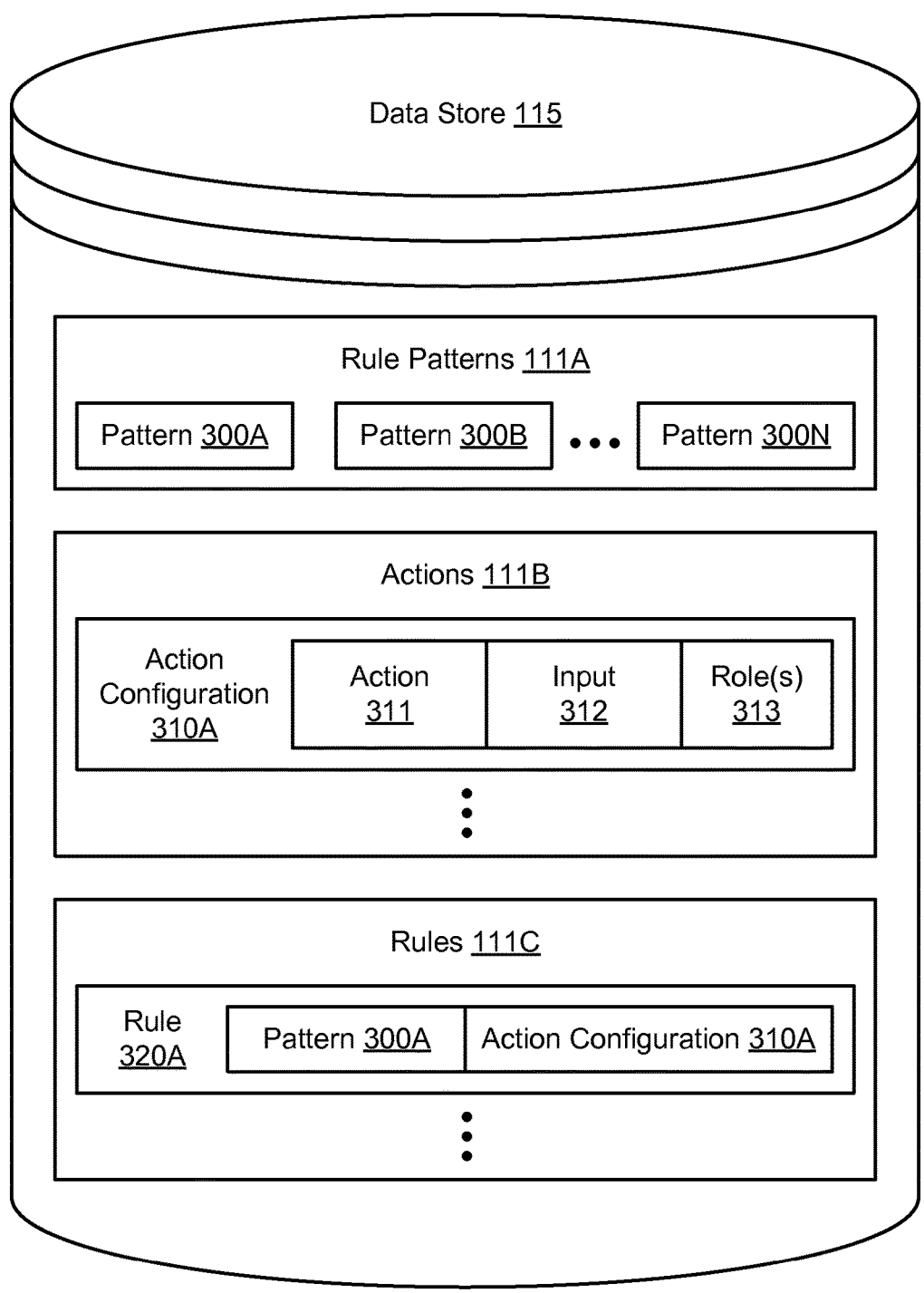
FIG. 3 illustrates further aspects of the example system environment for rule evaluation in a provider network, including a mapping of rule patterns to actions, according to some embodiments.

FIG. 3 illustrates further aspects of the example system environment rule evaluation in a provider network, including a mapping of rule patterns to actions, according to some embodiments. As discussed above, the data store 115 may store rule patterns 111A, actions 111B, and rules 111C. In the example shown in FIG. 3, the rule patterns 111A may include rule patterns 300A and 300B through 300N. However, it is contemplated that any suitable number of rule patterns may be stored in the data store 115.

In the example shown in FIG. 3, the actions 111B may include an action configuration 310A and one or more additional action configurations (not shown). Each action configuration (such as action configuration 310A) may include an action (such as action 311), any inputs for the action (such as input 312), and any roles (such as role(s) 313) needed for the action. An action may include one or more commands, instructions, or other invocations of functionality to perform one or more tasks. An action may be associated with inputs such as event-specific data to be supplied to the action. An action may be associated with inputs such as default parameters that apply to all invocations of the action. In one embodiment, run-time input parameters may also be specified for a particular instance of an action when the action is invoked. In one embodiment, the run-time input parameters may augment but not override the default parameters. For example, if an action involves resizing an image file when the image file is added, then the default parameters may include a target width and height, and the run-time input parameters may include the storage location of the image file. A role may include permissions or other security credentials that permit the action to have access to a set of resources at run-time. A role may be independent of any particular user or group of users and may represent a delegation of authority to the associated action.

In the example shown in FIG. 3, the rules 111C may include a rule 320A and one or more additional rules (not shown). The rule 320A may specify one of the rule patterns, such as rule pattern 300A, and one of the action configurations, such as action configuration 310A. When the rule pattern 300A is matched, the rule evaluator 120 may use the data store 115 to determine that the rule pattern 300A is part of rule 320A. The rule evaluator 120 may also use the data store 115 to determine that the action configuration 310A is also part of the rule 320A, e.g., is linked to the rule pattern 300A. The rule evaluator 120 may then cause the specified action 311 to be performed with the input 312 (and optionally run-time input parameters) and using the role(s) 313. In one embodiment, the message generator 130 may generate a message specifying the action 311, the input 312 (including, for example, any default parameters and/or run-time input parameters), and the role(s) 313.

In one embodiment, the rules 111C may include a mapping of rule patterns to actions. For example, a first rule may represent a binding of a rule pattern to a first action configuration, and a second rule may represent a binding of the same rule pattern to a second action configuration. When the rule pattern is matched, the rule evaluator 120 may use the data store 115 to determine that the rule pattern is part of both the first and second rules. The rule evaluator 120 may also use the data store 115 to determine that the first action configuration is part of the first rule and that the second action configuration is part of the second rule. The rule evaluator 120 may then cause the actions specified in both action configurations and to be performed. In one embodiment, the message generator 130 may generate one or more messages specifying the actions, the input associated with the actions, and any necessary role(s).

In one embodiment, the rules 111C may include a mapping of rule patterns to actions and/or a mapping of rule patterns to queue exchanges. For example, a first rule may represent a binding of a rule pattern to an action configuration. A second rule may represent a binding of the same rule pattern to a queue exchange. The queue exchange may specify one or more queue messages to be generated. When the rule pattern is matched, the rule evaluator 120 may use the data store 115 to determine that the rule pattern is part of the first and second rules. The rule evaluator 120 may also use the data store 115 to determine that the action configuration is part of the first rule and that the queue exchange is part of the second rule. The rule evaluator 120 may then cause the action specified in the action configuration to be performed. In one embodiment, the message generator 130 may generate one or more messages specifying the actions, the input associated with the actions, and any necessary role(s). Additionally, the rule evaluator 120 may generate a queue message as specified by the queue exchange and place that message in a queue or otherwise send the message to a messaging service. For example, the queue message may represent a notification (e.g., to an administrator or log) that the rule pattern was matched at a particular time or that the action in the action configuration was performed with particular parameters and at a particular time.

Event-Stream Searching Using Compiled Rule Patterns

Figure 4:
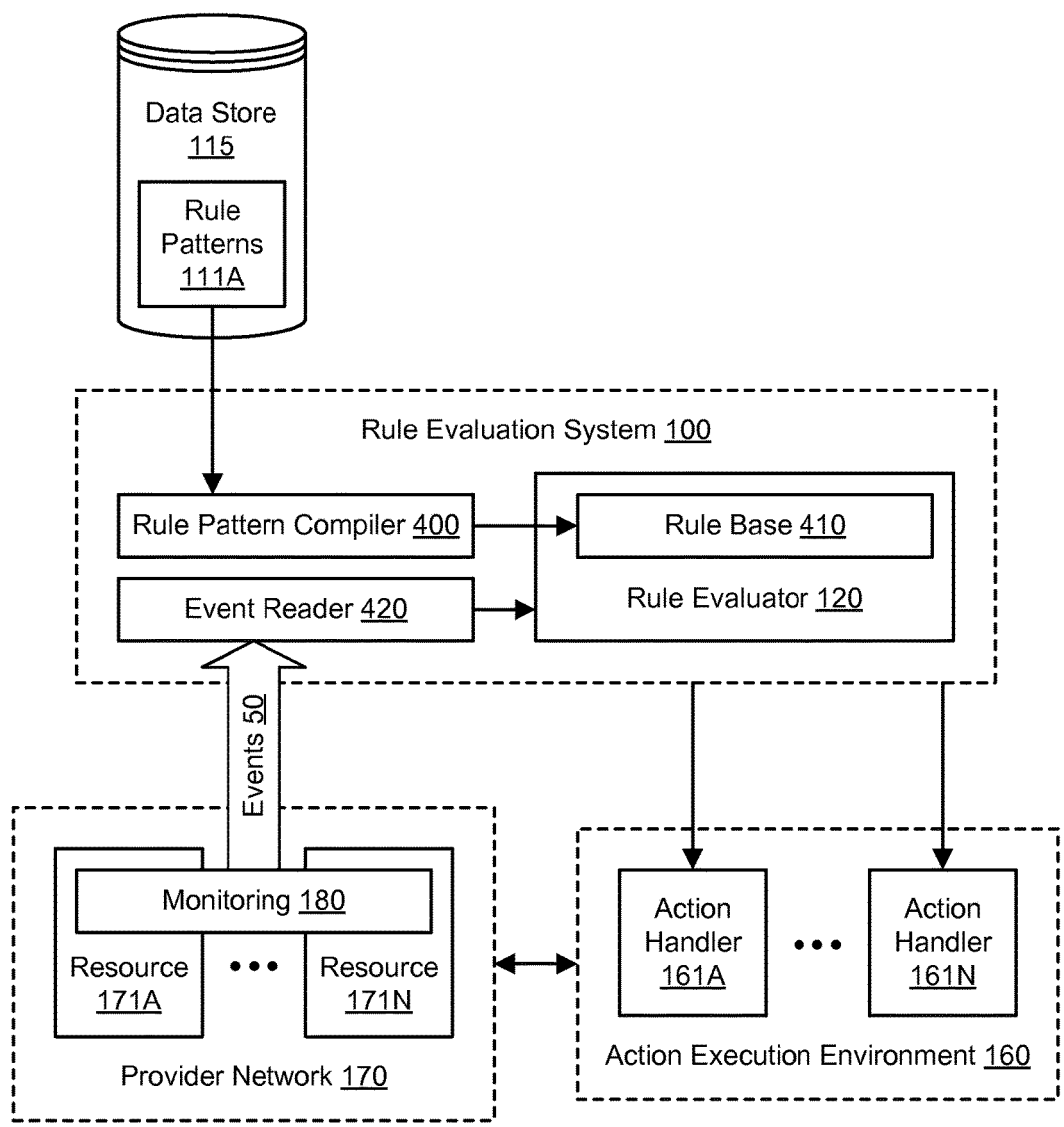
FIG. 4 illustrates an example system environment for event-stream searching using compiled rule patterns, according to some embodiments.

FIG. 4 illustrates an example system environment for event-stream searching using compiled rule patterns, according to some embodiments. In one embodiment, the monitoring functionality 180 may generate a plurality of events 50, and the rule evaluation system 100 may evaluate a compiled form of the rule patterns 111A against the events to determine which events (if any) match any of the rule patterns. The events may represent or indicate changes to resources (such as resources 171A-171N) in the provider network 170. The monitoring functionality 180 may monitor any of the resources, e.g., during operation and/or use of the resources, and it may detect resources, such as changes to the resources or the status of the resources, using any suitable monitoring techniques. For example, the monitoring functionality 180 may use agent software or any other suitable techniques to monitor individual resources. In one embodiment, monitoring the resources in the provider network may include monitoring one or more service logs, monitoring one or more service metrics, and/or monitoring any suitable data streams. The monitoring functionality 180 may generate events 50, and each event may describe one or more changes to one or more resources. Examples of formats for events are discussed below with reference to FIG. 5.

The monitoring functionality 180 may use any suitable techniques to convey the events 50 to the rule evaluation system 100. In one embodiment, the monitoring functionality 180 may place the events 50 in an event bus. The event bus may be used to deliver a stream of events, such that different events are placed on the bus and/or ready for delivery at different times. The rule evaluation system 100 may comprise an event reader 420 that receives events, such as by reading the events from the event bus or other stream. In one embodiment, clients of the provider network 170 may also supply events to the event reader 420, e.g., by placing the events in an event bus or other stream. In one embodiment, a single event bus or stream or multiple event buses or streams may be used to deliver events 50 to the rule evaluation system 100 for evaluation of potential matches with rule patterns. For example, the event bus may be divided into a plurality of shards, and each shard may be associated with one or more event readers. As will be discussed in greater detail below, events may be encapsulated in messages that include event metadata referred to as message envelopes; the events may be received as these messages by the event reader 420.

As discussed above with respect to FIG. 3, a rule may be defined to include one or more rule patterns and one or more actions and/or message exchanges. A rule pattern may represent one or more conditions that, when satisfied, may cause the rule evaluation system 100 to invoke any actions associated with any corresponding rules. The events 50 may describe conditions in the provider network 170, and the rule evaluation system 100 may evaluate a compiled form of the rule patterns 111A against the events to determine which events (if any) describe conditions corresponding to any of the rule patterns 111A. Accordingly, the rule evaluation system 100 may evaluate a compiled form of the rule patterns 111A against the events to determine which events (if any) match the rule patterns 111A.

The rule evaluation system 100 may include a rule compiler 400. Using the rule compiler 400, the rule evaluation system 100 may compile or otherwise generate a rule base 410 based (at least in part) on the rule patterns 111A. As used herein, the term compilation generally includes the transformation of rules or portions thereof (such as rule patterns that describe conditions) into another format. The compiled rule base 410 may include any suitable program instructions and/or data to capture or otherwise describe a set of one or more rule patterns in a manner that permits efficient evaluation of the rule patterns against events. In one embodiment, the rule base 410 may capture the set of rule patterns defined by or for a particular client of the provider network 170 rather than all the rule patterns in the data store 115. The rule base 410 may also be referred to as a machine object.

In one embodiment, the rule base 410 may represent a finite-state machine. The finite-state machine may represent a directed graph in which nodes represent finite states and edges represent transitions between those states. The finite-state machine may be in only one of the finite states at any particular time, and the finite-state machine may transition between these states when conditions in events match conditions in rule patterns. An example of such a finite-state machine is discussed below with respect to FIG. 6.

In one embodiment, the rule evaluation system 100 may include the rule evaluator 120. Using the rule evaluator 120, the rule evaluation system 100 may evaluate the rule base 410 against the events 50 to determine which events (if any) match any of the rule patterns captured in the rule base. In various embodiments, the rule evaluator 120 may analyze the content of events and/or metadata for events, such as a message envelope, in order to determine potential matches between events and rule patterns. As used herein, the matching of an event to a rule pattern (or vice versa) generally indicates that conditions described in an event and/or event metadata satisfy the conditions associated with one or more rule patterns. Accordingly, it may be said that the rule base 410 represents or captures the rule patterns associated with one or more rules, and the rule evaluator 120 may evaluate the rule base against the events to determine which events (if any) match any of the rule patterns in the rule base. In one embodiment, the events 50 used as input to the rule evaluator 120 may represent events for resources owned by a particular client of the provider network 170, e.g., the same client whose rule patterns are compiled into the rule base 410. Accordingly, aspects of the rule evaluation system 100, such as the rule evaluator 120 and/or event reader 420, may be implemented on a per-client basis.

When an event matches a rule pattern, the rule evaluation system 100 may invoke or cause to be performed any actions specified in any rules that include the rule pattern. In one embodiment, the rule evaluation system 100 may send suitable information (including all or part of an event matching a rule pattern as well as other parameters for any related actions) to one or more action handlers, such as action handlers 161A-161N, in an action execution environment 160. The actions performed by the action handlers 161A-161N may include any suitable modification and/or configuration of any of the resources 171A-171N and/or their constituent elements. In one embodiment, the rule evaluator may modify an event that matches a rule pattern and then store and/or forward the modified event.

The rule evaluation system 100 may be implemented using one or more computing devices, any of which may be implemented by the example computing device 3000 illustrated in FIG. 19. In various embodiments, portions of the functionality of the rule evaluation system 100 may be provided by the same computing device or by any suitable number of different computing devices. If any of the components of the rule evaluation system 100 are implemented using different computing devices, then the components and their respective computing devices may be communicatively coupled, e.g., via a network. Each of the illustrated components may represent any combination of software and hardware usable to perform their respective functions. It is contemplated that the rule evaluation system 100 may include additional components not shown, fewer components than shown, or different combinations, configurations, or quantities of the components shown.

Figure 5:
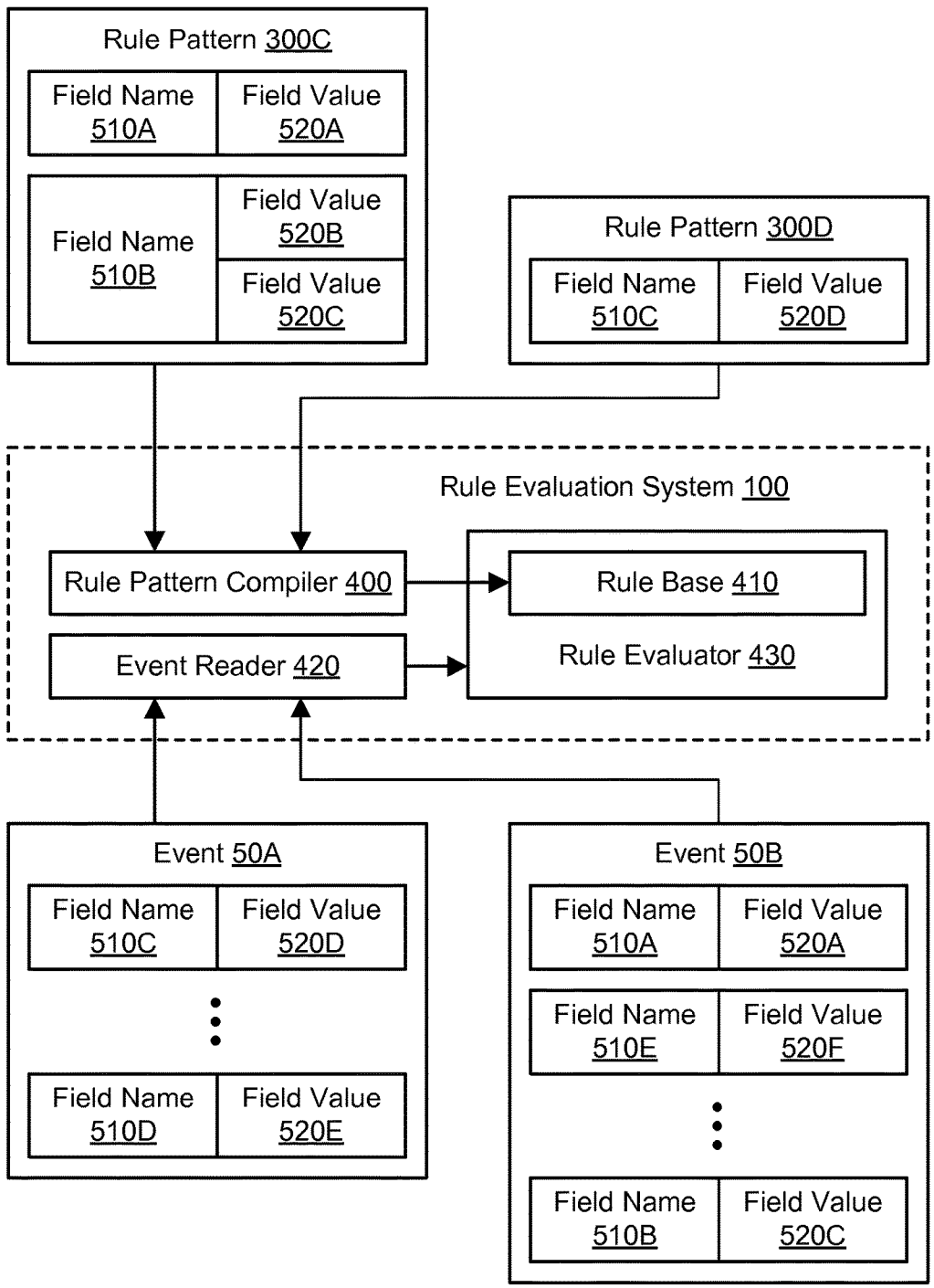
FIG. 5 illustrates further aspects of the example system environment for event-stream searching using compiled rule patterns, including examples of events that match particular rule patterns, according to some embodiments.

FIG. 5 illustrates further aspects of the example system environment for event-stream searching using compiled rule patterns, including examples of events that match particular rule patterns, according to some embodiments. Rule patterns 300C and 300D represent examples of rule patterns that may be compiled into the rule base 410. Each rule pattern may include one or more field names. For each field name, the rule pattern may include one or more field values. For example, rule pattern 300C may include a first field name 510A and an associated field value 520A. Rule pattern 300C may also include a second field name 510B and two associated field values 520B and 520C. Field names and their associated values may generally describe characteristics or attributes of resources in the provider network 170. In some cases, a field name may include a nested or otherwise hierarchical structure that may be flattened during compilation of the rule patterns. The rule evaluation system 100 may evaluate potential matches based on arbitrary or user-defined Boolean combinations of field names and/or field values. For example, in one embodiment, for the rule pattern 300C to be matched by an event, all of the field names 510A and 510B should be present in the event; however, any one of the field values for a field name (e.g., either value 520B or value 520C for name 510B) may satisfy the conditions represented by the rule pattern. As another example, rule pattern 300D may include a field name 510C and an associated field value 520D. In one embodiment, for the rule pattern 300D to be matched by an event, the field name 510C and associated field value 520D should be present in the event.

Events 50A and 50B represent examples of events that may be used as input into the rule evaluation 430. Each event may include one or more field names. For each field name, the event may include one or more field values. For example, event 50A may include a field name 510C and associated field value 520D as well as a field name 510D and associated field value 520E. Field names and their associated values in events 50 may generally describe characteristics or attributes of resources in the provider network 170. In some cases, a field name in an event may include a nested or otherwise hierarchical structure that may be flattened prior to rule evaluation against the event. The event 50A may also include other field names (not shown), as indicated by the ellipsis. As another example, event 50B may include a field name 510A and associated field value 520A, a field name 510E and associated field value 520F, and a field name 510B and associated field value 520C. The event 50B may also include other field names (not shown), as indicated by the ellipsis.

In one embodiment, the events 50A and 50B may be represented initially using a structured, hierarchical format such as JSON or XML. In such a format, the events 50A and 50B may include nested structures such that some field names may be represented by different name components across different levels of the hierarchy. Prior to evaluating such events, the rule evaluation system 100 may flatten the events and sort the field names within the events. For example, flattening the event 50A or 50B may include extracting the field names (with their associated values) from a hierarchy or other structured format in the event and placing them in a flattened event. The field names within a flattened event may then be sorted and reordered using any suitable basis (e.g., alphabetically) to generate a flattened and sorted event.

Rule patterns 111A may also be represented initially using a structured, hierarchical format such as JSON or XML. Accordingly, the rule patterns 300C and 300D may also be flattened and have their field names sorted on the same basis as the events. For example, rule pattern 300C may initially be defined as follows:

```
{
    "detail-type": [ "ec2/spot-bid-matched" ],
    "detail": {
        "state": [ "in-service", "stopped" ]
    }
}
```

In one embodiment, the initial definition of rule pattern 300C may be flattened to produce the following rule, where "detail-type" represents field name 510A, "ec2/spot-bid-matched" represents field value 520A, "detail.state" represents field name 510B, and "in-service" and "stopped" represent field values 520B and 520C:

"detail-type", "ec2/spot-bid-matched",
"detail.state", "in-service",
"detail.state", "stopped"

As another example, rule pattern may initially be defined as follows:

```
{
    "detail" : {
        "state": [ "pending" ]
    }
}
```

In one embodiment, the initial definition of rule pattern 300D may be flattened to produce the following rule, where "detail.state" represents field name 510C and "pending" represents field value 520D:

"detail.state", "pending"

In one embodiment, the rule evaluation 430 may examine each event only for field names matching one or more rule patterns and may disregard other field names present in the event. For example, when the event 50A is received, the rule evaluation 430 may evaluate the rule patterns 300C and 300D against the event using the rule base 410. The event 50A may match the rule pattern 300D because the event includes the field name 510C and associated field value 520D described in the rule pattern. In one embodiment, once the name 510C and value 520D are found in the event 50A, the rule evaluation 430 may determine that the rule pattern 300D has been matched by the event. The rule evaluation 430 may determine that the rule pattern 300C is not matched by the event 50A once the names 510A and 510B are not found in the event. If the rule base captures only the rules 300C and 300D, then the rule evaluation 430 may examine the event 50A only for field names 510A, 510B, and 510C and disregard other field names in the event (such as name 510D).

As another example, when the event 50B is received, the rule evaluation 430 may evaluate the rules 300C and 300D against the event using the rule base 410. The event 50B may match the rule pattern 300C because the event includes the field name 510A and associated field value 520A described in the rule pattern as well as the field name 510B and one of the associated field values 520C described in the rule pattern. In one embodiment, once the names 510A and 510B and associated values are found in the event 50B, the rule evaluation 430 may determine that the rule pattern 300C has been matched by the event. The rule evaluation 430 may determine that the rule pattern 300D is not matched by the event 50B once the name 510C is not found in the event. If the rule base captures only the rule patterns 300C and 300D, then the rule evaluation 430 may examine the event 50B only for field names 510A, 510B, and 510C and disregard other field names in the event (such as name 510E).

Field names and field values may be defined arbitrarily by users and/or resources; the rule evaluation system 100 may operate without reference to any schemas for rule patterns and events. The internal sorting of the rule patterns and events by field name may permit an efficient evaluation of the rule base 410 against the events. In one embodiment, the evaluation may be implemented such that performance of the evaluation may not vary substantially based on differences in the number of rule patterns (e.g., the evaluation may be an O(1) operation in terms of the number of rule patterns). In one embodiment, the evaluation may be able to process hundreds of thousands of events per second.

Figure 6:
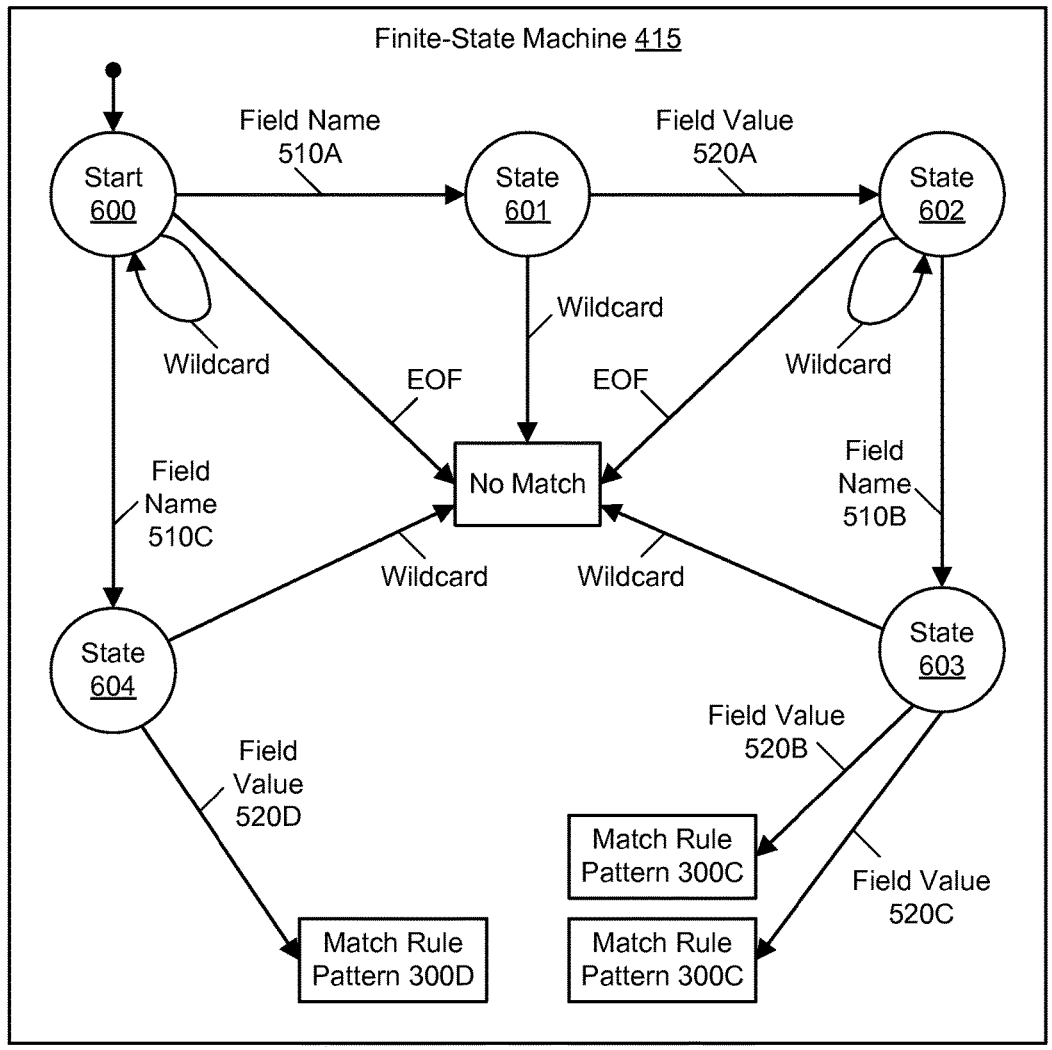
FIG. 6 illustrates an example of a finite-state machine usable for event-stream searching using compiled rule patterns, according to some embodiments.

FIG. 6 illustrates an example of a finite-state machine usable for event-stream searching using compiled rule patterns, according to some embodiments. As discussed above, the rule base 410 may represent a finite-state machine 415. The finite-state machine 415 may represent a directed graph in which nodes represent finite states and edges represent transitions between those states. The finite-state machine 415 may be in only one of the finite states at any particular time, and the finite-state machine may transition between these states when conditions in events match conditions in rule patterns. The example of the finite-state machine 415 may include states such as initial state 600 (also referred to as a start state) and subsequent or additional states 601, 602, 603, and 604. Each of the states 600-604 may be implemented using a hash table for efficient matching of tokens. The finite-state machine 415 may be compiled based on the rules 300C and 300D.

When evaluation of the rule patterns against a particular event is initiated, the finite-state machine 415 may begin in the initial state 600. While the finite-state machine 415 is in the initial state 600, the evaluation may proceed through the sorted field names in the event until the name 510A or name 510C is encountered or until the end of file (EOF) is encountered in the event. If EOF is encountered in state 600, then the evaluation may determine that the event does not match any of the rule patterns 300C or 300D, and the finite-state machine 415 may be exited. Any field name other than names 510A and 510C may represent an implicit wildcard, and the finite-state machine 415 may stay in the initial state 600 if such a field name is encountered in the event. If the field name 510A is matched in the event while in state 600, then the match may cause a transition from state 600 to state 601. In state 601, if any field value other than value 520A is encountered, then the evaluation may determine that the event does not match the rule pattern 300C. If the field value 520A is matched in the event while in state 601, then the match may cause a transition from state 601 to state 602.

While the finite-state machine 415 is in the state 602, the evaluation may proceed through the sorted field names in the event until the name 510B is encountered or until the end of file (EOF) is encountered in the event. If EOF is encountered in state 602, then the evaluation may determine that the event does not match the rule pattern 300C. Any field name other than name 510B may represent an implicit wildcard, and the finite-state machine 415 may stay in the state 602 if such a field name is encountered in the event. If the field name 510B is matched in the event, then the match may cause a transition from state 602 to state 603. In state 603, if any field value other than value 520B or 520C is encountered, then the evaluation may determine that the event does not match the rule pattern 300C. If the field value 520B or 520C is matched in the event while in state 603, then the evaluation may determine that the event matches the rule pattern 300C.

If the field name 510C is found in the event while in state 600, then the match may cause a transition from state 600 to state 604. In state 604, if any field value other than value 520D is encountered, then the evaluation may determine that the event does not match the rule pattern 300D. If the field value 520D is matched in the event while in state 604, then the evaluation may determine that the event matches the rule pattern 300D.

Figure 7:
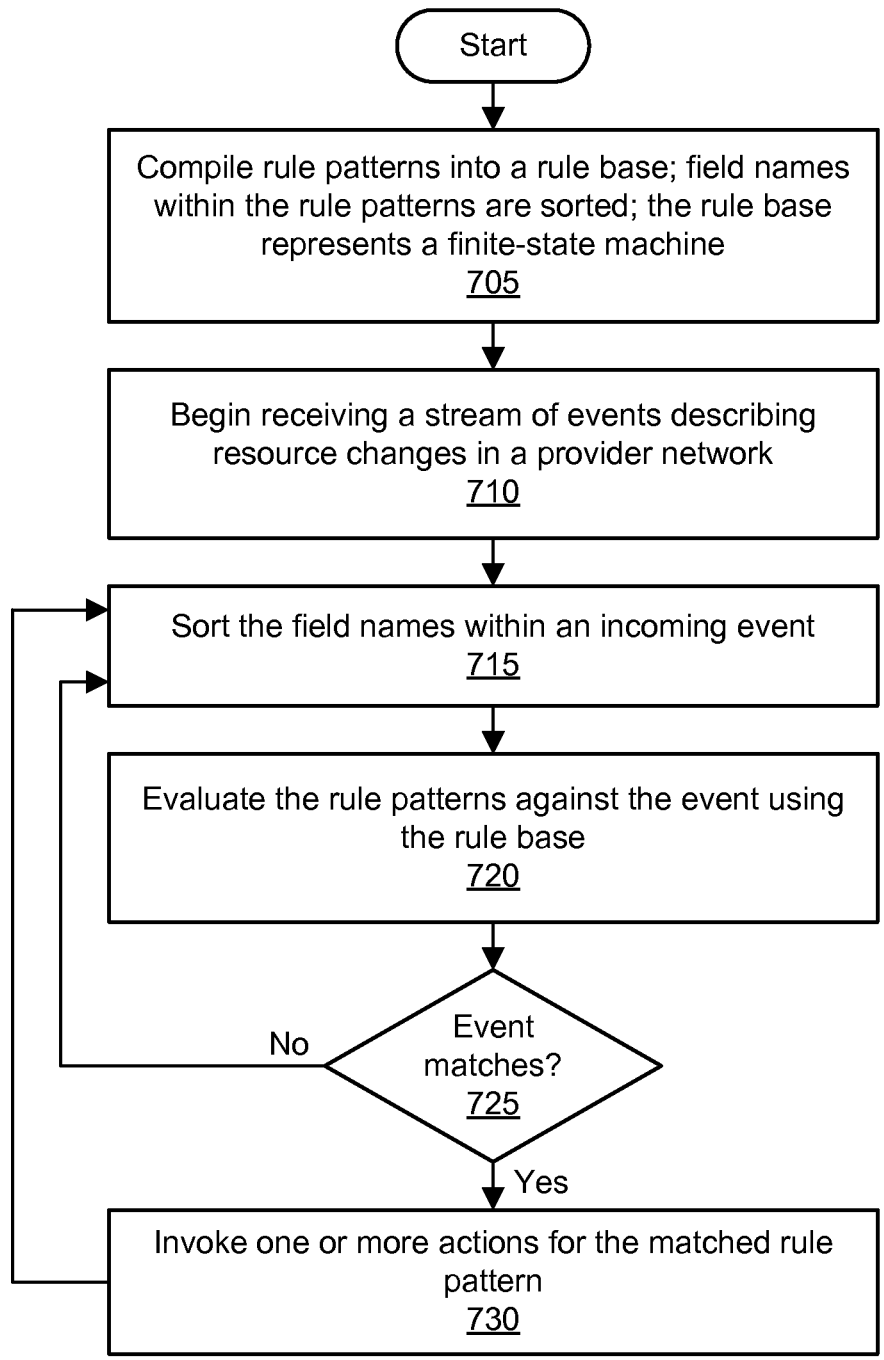
FIG. 7 is a flowchart illustrating a method for event-stream searching using compiled rule patterns, according to some embodiments.

FIG. 7 is a flowchart illustrating a method for event-stream searching using compiled rule patterns, according to some embodiments. As shown in 705, a set of one or more rule patterns may be compiled into a rule base. Each pattern includes one or more field names and one or more field values for each of the field name(s). The field names within a rule pattern may be sorted (e.g., alphabetically) during the compilation process. In one embodiment, field names may be flattened to eliminate a hierarchical structure in addition to being sorted. The rule base may represent a finite-state machine that includes a plurality of states. Transitions between the states may correspond to matches of field names and/or matches of field values.

As shown in 710, a stream of events may begin to be received. The events may describe resources, such as changes to the resources or the status of the resources, in a provider network. The events may include field names and field values for the field names that describe characteristics or attributes of changed resources. The field names within an event may be sorted (e.g., alphabetically) upon receipt. In one embodiment, field names in events may be flattened to eliminate a hierarchical structure in addition to being sorted.

After being internally sorted by field name, each event in the stream may be analyzed as shown in 720 and 725. As shown in 720, the rule patterns may be evaluated against the events using the rule base. In one embodiment, the evaluation may determine that a particular event does not match a particular rule pattern if the field names in the particular rule pattern are not found in the particular event. The evaluation may be based on arbitrary or user-defined Boolean combinations of field names and/or field values. For example, in one embodiment, a match of a particular event to a particular rule pattern may be determined if all the field names in the particular rule pattern are found in the particular event and if any field values for the field names in the particular rule pattern are found in the particular event. Field names in events that do not match field names in rules may be considered implicit wildcards and may be disregarded. In one embodiment, field names that represent wildcards may cause the finite-state machine to remain in a current state.

As shown in 725, the evaluation may determine if a rule pattern is matched by an event. In determining a matched rule pattern, the finite-state machine may transition between at least two of the states. For example, the finite-state machine may transition between a first state and a second state when a field name from a rule pattern is found in an event, and the finite-state machine may transition between the second state and a third state when a satisfactory field value for the field name is found in the event. If a rule is not matched, then the sorting and evaluation may proceed for additional events, as shown in 715. If a matched rule pattern is found, then as shown in 730, one or more actions for the matched rule pattern (e.g., as specified in one or more rules) may be invoked or performed. For example, the actions may be performed in the provider network, e.g., to modify or configure one or more resources. Actions may also be performed (e.g., by the rule evaluation system) to modify events themselves when those events are determined to match particular rule patterns.

Freshness-Sensitive Message Delivery

Figure 8:
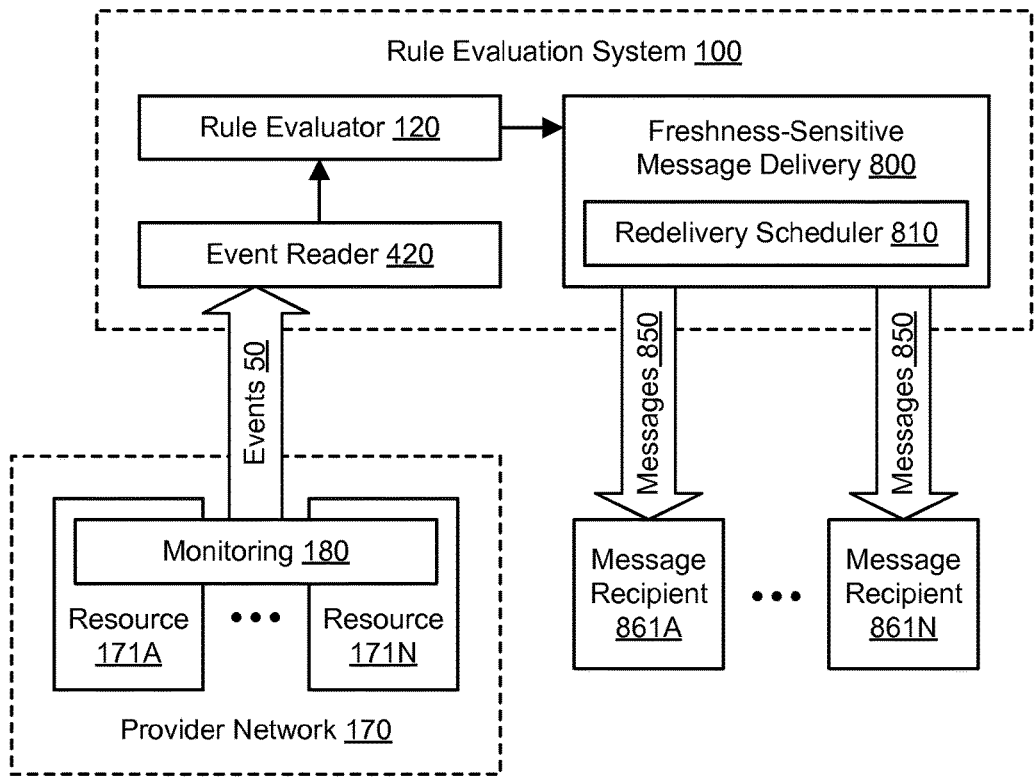
FIG. 8 illustrates an example system environment for freshness-sensitive message delivery, according to some embodiments.

FIG. 8 illustrates an example system environment for freshness-sensitive message delivery, according to some embodiments. In one embodiment, the rule evaluation system 100 may include a component or functionality for freshness-sensitive message delivery 800. As discussed above, events 50 that describe resources, such as changes to the resources or the status of the resources, in a provider network may be received by an event reader 420. However, it is contemplated that the events 50 may also represent other types of events and/or sources of events. In one embodiment, a rule evaluator 120 may determine that one or more of the events 50 match particular rule patterns. When a match of a rule pattern and an event is found, a suitable component of the rule evaluation system 100, such as the message delivery component 800, may generate a message that is indicative of the event. For example, the message may encapsulate the event or may include relevant portions of the event. In one embodiment, the message may also include one or more actions or action configurations representing instructions for one or more actions to be implemented by a recipient of the message (e.g., based on contents of the event). In one embodiment, the message delivery component 800 may implement aspects of the message generator 130 shown in FIG. 2, e.g., such that the message delivery component 800 may generate messages intended for delivery using a messaging service 140.

Turning back to FIG. 8, the message delivery component 800 may deliver (or attempt to deliver) messages 850 to one or more recipients. For example, the message delivery component 800 may deliver (or attempt to deliver) messages 850 to recipients 861A-861N. The recipients 861A-861N may represent any suitable computing devices or processes, such as devices or processes that store information from events or perform other actions in related to events. In one embodiment, the recipients 861A-861N may represent one or more action handlers such as action handlers 161A-161N. As used herein, the terms "recipient" and "intended recipient" are generally intended to include any of the recipients 861A-861N and/or action handlers 161A-161N.

The message delivery component 800 may perform delivery attempts for messages 850 in a manner that is sensitive to the relative freshness of messages. In one embodiment, initial attempts to deliver messages may be performed as soon as possible after the related events arrive and/or are evaluated for pattern matching. If an attempt to deliver a message fails, a redelivery attempt may be scheduled at a further point in time. If a redelivery attempt fails, another redelivery attempt may be scheduled at an even further point in time. The message delivery component 800 may include a redelivery scheduler 810 that determines suitable times for attempting redelivery of messages. Redelivery attempts may be scheduled at a decreasing rate, e.g., using an exponential backoff algorithm. Delivery attempts may be performed for newer messages (e.g., messages based on later-received events) without being delayed or blocked by redelivery attempts for older messages (e.g., messages based on earlier-received events). In one embodiment, delivery attempts for a message may continue to be performed only as long as a freshness value (e.g., for the message and/or corresponding event) is sufficient. The freshness value may decay over time as a function of an elapsed time for the message and/or event and/or a number of delivery attempts for the message. To determine whether to continue the attempted delivery of a message, the freshness value at a particular point in time may be compared to a threshold that is determined based on suitable characteristics of the event. For example, the freshness value can indicate that the message or event is only valid or interesting within an amount of time, such as within one minute after it is sent or occurs; after that time, the message is no longer useful or relevant. Thus, the freshness-sensitive message delivery may ignore or discard a message or event that has a freshness value that is too low. Accordingly, the message delivery component 800 may preserve the freshness of newer messages while considering the declining freshness of older messages.

Figure 9:
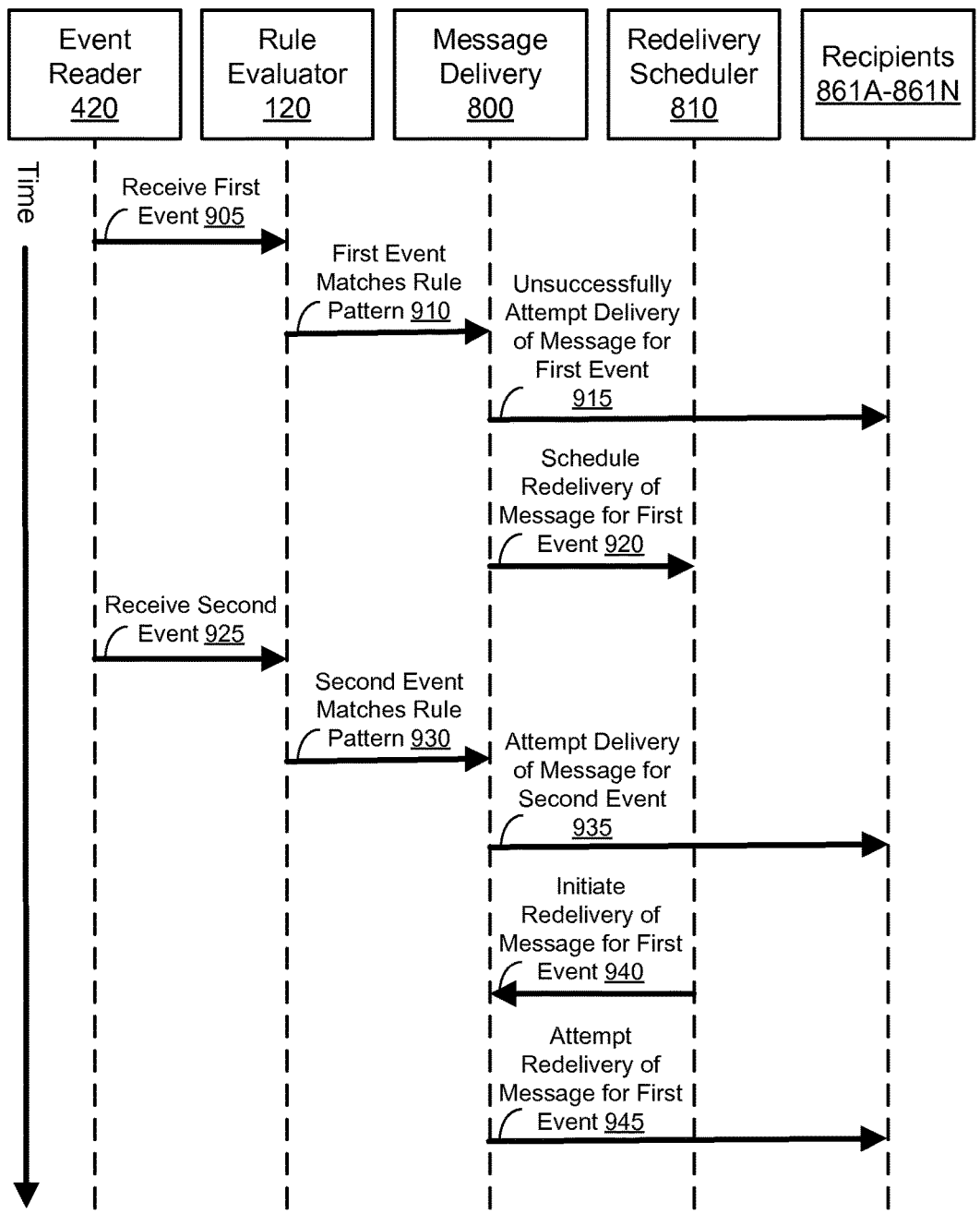
FIG. 9 illustrates an example of the timing of events for freshness-sensitive message delivery, including attempting delivery of a later-received message before attempting redelivery of an earlier-received message, according to some embodiments.

FIG. 9 illustrates an example of the timing of events for freshness-sensitive message delivery, including attempting delivery of a later-received message before attempting redelivery of an earlier-received message, according to some embodiments. Operations as indicated in 905-945 may occur in a particular order over time, from the operation indicated in 905 to the operation indicated in 945. As shown in 905, a first event may be received. The first event may describe one or more resources, such as changes to the resource(s) or the status of the resource(s), in a provider network. The first event may be received in an event stream by an event reader 420 at a first point in time. The event reader may be coupled to a rule evaluator 120. As shown in 910, the rule evaluator 120 may determine that the first event matches one or more rule patterns.

A first message may be generated such that the message is indicative of the first event. For example, the first message may encapsulate the first event or may include relevant portions of the first event. In one embodiment, the first message may also include one or more actions or action configurations representing instructions for one or more actions to be implemented by a recipient of the first message (e.g., based on contents of the first event). In one embodiment, the first message may be generated as a result of the event matching the one or more rule patterns, e.g., as determined by the rule evaluator 120.

As shown in 915, a first attempt to deliver the first message may be performed by a message delivery component 800. The target of the first attempt to deliver the message may be an action handler or other intended recipient, such as any of recipients 861A-861N. The first attempt to deliver the first message may be deemed unsuccessful. The failure of the first attempt may be determined by receipt of an error indication, by a timeout of the delivery attempt, and/or through any other suitable mechanism. The cause of the unsuccessful delivery attempt may be the failure or unavailability of the intended recipient, the failure of unavailability of one or more networks or components thereof, and/or any other suitable cause.

As shown in 920, an attempt to redeliver the first message may be scheduled by a redelivery scheduler 810. Redelivery attempts may be scheduled at a decreasing rate, such that the duration between attempts may tend to increase over time. In one embodiment, the redelivery attempts may be scheduled using an exponential backoff algorithm. The exponential backoff algorithm may multiplicatively decrease the rate of the redelivery attempts. In one embodiment, the exponential backoff algorithm may include a "jitter" component in which scheduled times are determined such that they vary within some set of boundaries (e.g., using a random or pseudo-random value). In one embodiment, a redelivery attempt may be scheduled by storing information indicative of the first message and/or first event in a suitable data store or queuing system with an indication of the scheduled time to attempt redelivery. In one embodiment, the redelivery may be scheduled only if a freshness value for the message and/or event has not decayed to a point (e.g., a value of zero) at which the message and/or event is considered expired.

As shown in 925, a second event may be received by the event reader 420. The second event may describe one or more resources, such as changes to the resource(s) or the status of the resource(s), in the provider network. Although FIG. 9, for purposes of example, illustrates the second event as being received after the operation shown in 920, it is contemplated that the second event may be received at substantially any point in time after the first event is received as shown in 905. As shown in 930, the rule evaluator 120 may determine that the second event matches one or more rule patterns.

A second message may be generated such that the message is indicative of the second event. For example, the second message may encapsulate the second event or may include relevant portions of the second event. In one embodiment, the second message may also include one or more actions or action configurations representing instructions for one or more actions to be implemented by a recipient of the second message (e.g., based on contents of the second event). In one embodiment, the second message may be generated as a result of the event matching the one or more rule patterns, e.g., as determined by the rule evaluator 120.

As shown in 935, an attempt to deliver the second message may be performed. The target of the first attempt to deliver the message may be an action handler or other intended recipient, such as any of recipients 861A-861N. The intended recipient of the second message may be the same intended recipient as the first message or may instead be a different intended recipient. In various embodiments, the attempt to deliver the second message may be successful or unsuccessful. If the attempt to deliver the second message is unsuccessful, then a redelivery attempt may be scheduled for the second message, e.g., in a similar manner as discussed above with respect to the first message. The intended recipient may perform one or more actions upon successful receipt of the second message, e.g., as specified in the second message.

The attempt to deliver the second message may not be delayed or blocked by any of the redelivery attempts for the first message. As shown in 940, the previously scheduled redelivery attempt for the first message may be initiated. The redelivery attempt may be initiated by the redelivery scheduler 810 on or around the scheduled time, e.g., in response to the arrival of the scheduled time. As shown in 945, the redelivery of the first message may be attempted by the message delivery component 800. Performing a redelivery attempt may include attempting to send the same message to the same recipient as the original attempt. In one embodiment, the redelivery may be initiated and attempted only if a freshness value for the message and/or event has not decayed to a point (e.g., a value of zero) at which the message and/or event is considered expired. In various embodiments, the attempt to redeliver the first message may be successful or unsuccessful. If the attempt to redeliver the first message is unsuccessful, then an additional redelivery attempt may be scheduled for the first message, e.g., in a similar manner as discussed above with respect to the operation shown in 920. The intended recipient may perform one or more actions upon successful receipt of the first message, e.g., as specified in the first message.

Figure 10:
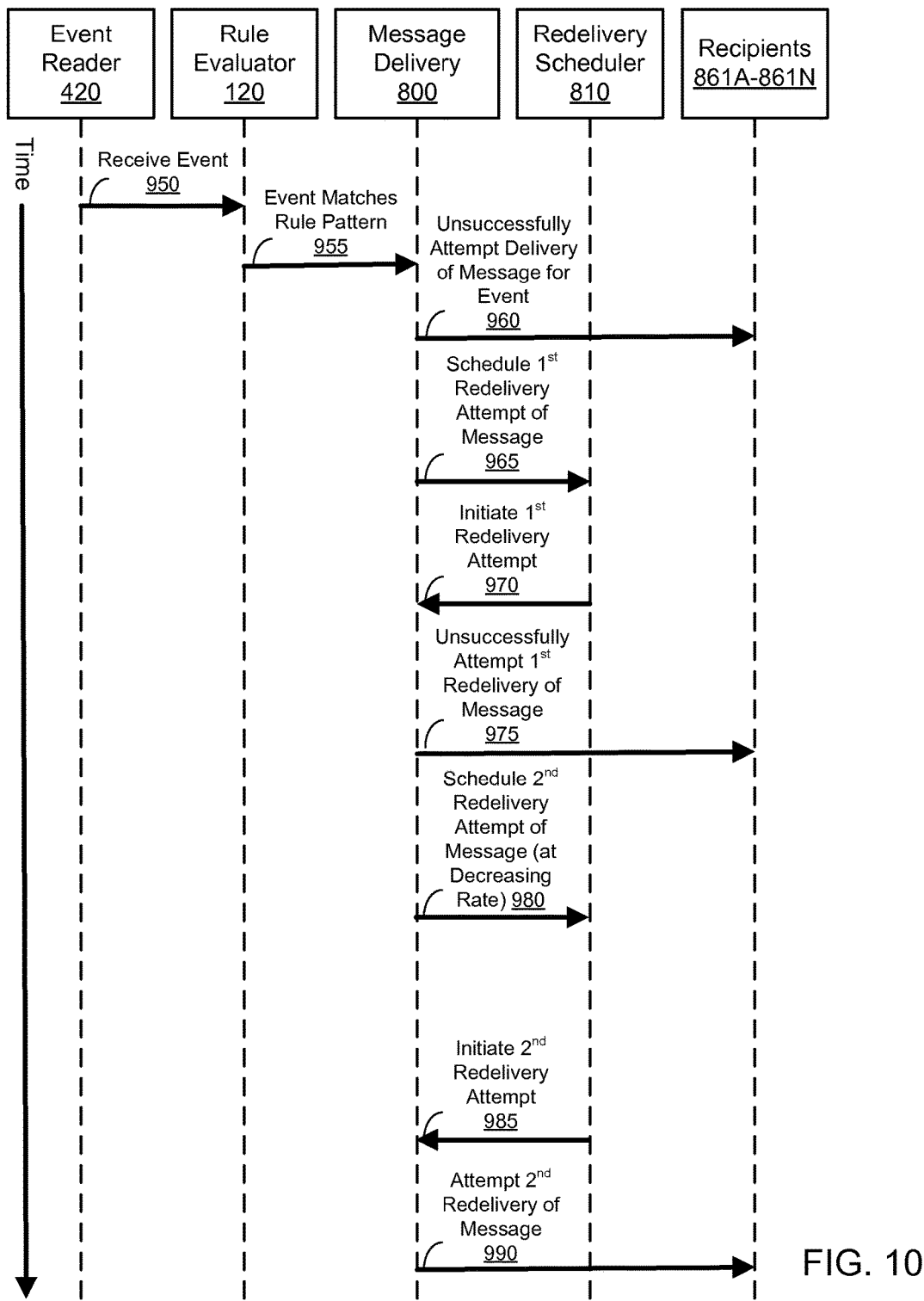
FIG. 10 illustrates an example of the timing of events for freshness-sensitive message delivery, including redelivery at a decreasing rate, according to some embodiments.

FIG. 10 illustrates an example of the timing of events for freshness-sensitive message delivery, including redelivery at a reduced rate, according to some embodiments. Operations as indicated in 950-990 may occur in a particular order over time, from the operation indicated in 950 to the operation indicated in 990. As shown in 950, an event may be received. The event may describe one or more resources, such as changes to the resource(s) or the status of the resource(s), in a provider network. The event may be received in an event stream by an event reader 420. The event reader may be coupled to a rule evaluator 120. As shown in 955, the rule evaluator 120 may determine that the first event matches one or more rule patterns.

A message may be generated such that the message is indicative of the event. For example, the message may encapsulate the event or may include relevant portions of the event. In one embodiment, the message may also include one or more actions or action configurations representing instructions for one or more actions to be implemented by a recipient of the message (e.g., based on contents of the event). In one embodiment, the message may be generated as a result of the event matching the one or more rule patterns, e.g., as determined by the rule evaluator 120.

As shown in 960, a first attempt to deliver the message may be performed by a message delivery component 800. The target of the first attempt to deliver the message may be an action handler or other intended recipient, such as any of recipients 861A-861N. The first attempt to deliver the message may be deemed unsuccessful. The failure of the first attempt may be determined by receipt of an error indication, by a timeout of the delivery attempt, and/or through any other suitable mechanism. The cause of the unsuccessful delivery attempt may be the failure or unavailability of the intended recipient, the failure of unavailability of one or more networks or components thereof, and/or any other suitable cause. As shown in 965, an attempt to redeliver the message may be scheduled by a redelivery scheduler 810. In one embodiment, a redelivery attempt may be scheduled by storing information indicative of the message and/or event in a suitable data store or queuing system with an indication of the scheduled time to attempt redelivery. In one embodiment, the first redelivery may be scheduled only if a freshness value for the message and/or event has not decayed to a point (e.g., a value of zero) at which the message and/or event is considered expired.

As shown in 970, the previously scheduled redelivery attempt for the message may be initiated. The redelivery attempt may be initiated by the redelivery scheduler 810 on or around the scheduled time, e.g., in response to the arrival of the scheduled time. As shown in 975, the first attempt at redelivery of the message may be performed by the message delivery component 800. Performing a redelivery attempt may include attempting to send the same message to the same recipient as the original attempt. In one embodiment, the first redelivery may be initiated and attempted only if a freshness value for the message and/or event has not decayed to a point (e.g., a value of zero) at which the message and/or event is considered expired. The first attempt to redeliver the message may be deemed unsuccessful. The failure of the first attempt to redeliver may be determined by receipt of an error indication, by a timeout of the delivery attempt, and/or through any other suitable mechanism. The cause of the unsuccessful redelivery attempt may be the failure or unavailability of the intended recipient, the failure of unavailability of one or more networks or components thereof, and/or any other suitable cause.

As shown in 980, a second attempt to redeliver the message may be scheduled by the redelivery scheduler 810. In one embodiment, the second redelivery attempt may be scheduled by storing information indicative of the message and/or event in a suitable data store or queuing system with an indication of the scheduled time to attempt redelivery. In one embodiment, the second redelivery may be scheduled only if a freshness value for the message and/or event has not decayed to a point (e.g., a value of zero) at which the message and/or event is considered expired.

Redelivery attempts may be scheduled at a decreasing rate, such that the duration between attempts may tend to increase over time. Accordingly, the duration of time between the unsuccessful first redelivery attempt in 975 and the scheduled time for the second redelivery attempt may be greater than the duration of time between the unsuccessful first delivery attempt in 960 and the unsuccessful first redelivery attempt in 975. In one embodiment, the redelivery attempts may be scheduled using an exponential backoff algorithm. The exponential backoff algorithm may multiplicatively decrease the rate of the redelivery attempts. In one embodiment, the exponential backoff algorithm may include a "jitter" component in which scheduled times are determined such that they vary within some set of boundaries (e.g., using a random or pseudo-random value).

As shown in 985, the second redelivery attempt for the message may be initiated. The second redelivery attempt may be initiated by the redelivery scheduler 810 on or around the scheduled time, e.g., in response to the arrival of the scheduled time. As shown in 990, the second attempt at redelivery of the message may be performed by the message delivery component 800. Performing the redelivery attempt may include attempting to send the same message to the same recipient as the original attempt. In various embodiments, the second attempt to redeliver the message may be successful or unsuccessful. If the second attempt to redeliver the message is unsuccessful, then a third redelivery attempt may be scheduled for the message, e.g., in a similar manner as discussed above with respect to the operations shown in 965 and 980. However, the third redelivery attempt may be scheduled based on the decreasing rate, such that the duration of time between an unsuccessful second redelivery attempt in 990 and the scheduled time for the third redelivery attempt may be greater than the duration of time between the unsuccessful first redelivery attempt in 975 and a unsuccessful second redelivery attempt in 990. In one embodiment, the second redelivery may be initiated and attempted only if a freshness value for the message and/or event has not decayed to a point (e.g., a value of zero) at which the message and/or event is considered expired.

Figure 11:
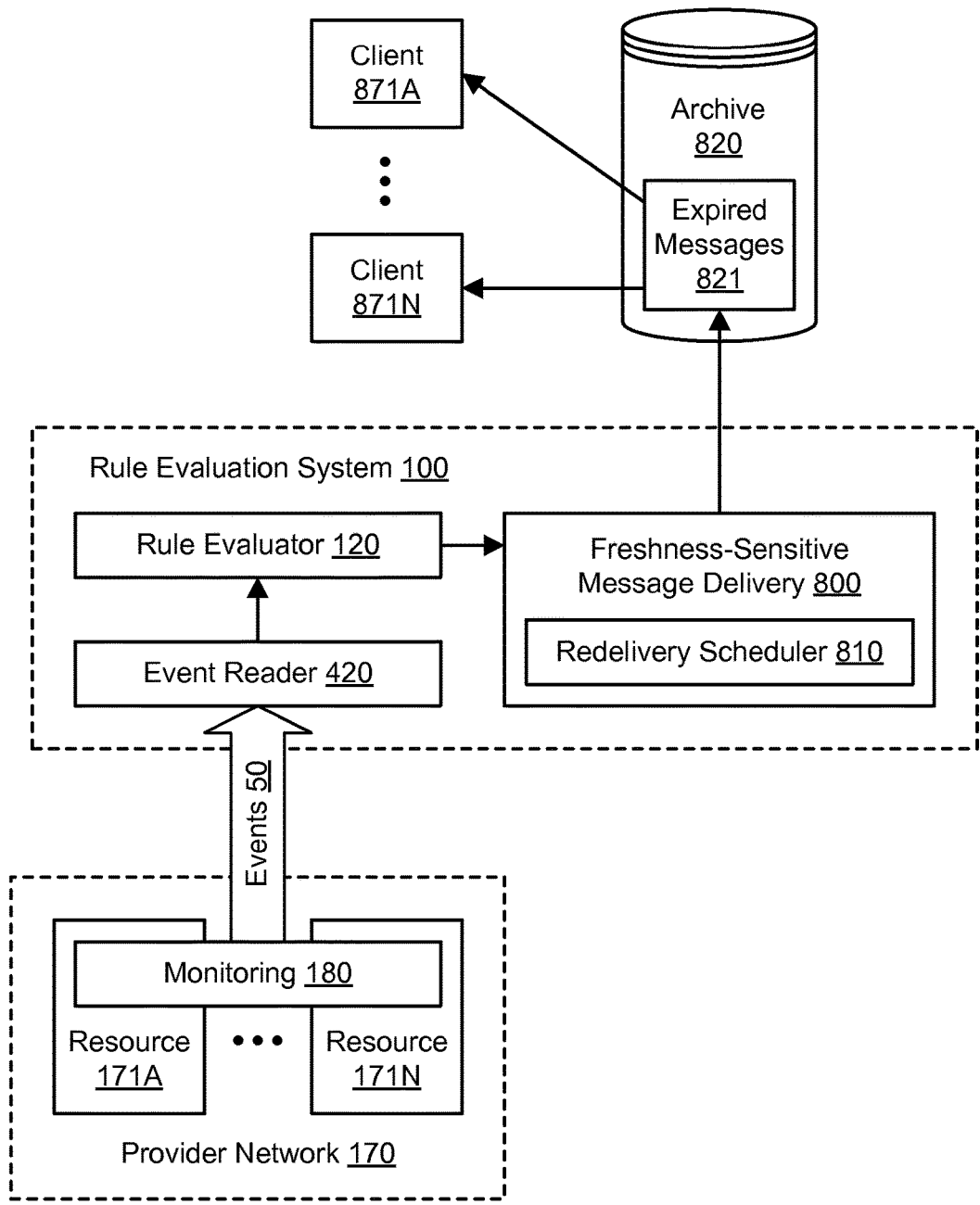
FIG. 11 illustrates further aspects of the example system environment for freshness-sensitive message delivery, including archiving of expired messages, according to some embodiments.

FIG. 11 illustrates further aspects of the example system environment for freshness-sensitive message delivery, including archiving of expired messages, according to some embodiments. In various embodiments, messages may be considered expired messages 821 on any suitable basis. In one embodiment, after a particular number of unsuccessful attempts to a deliver a message, the message may be considered expired. In one embodiment, after a particular duration between delivery attempts without successful delivery of a message, the message may be considered expired. In one embodiment, after a particular duration since receipt of the event without successful delivery of a message, the message may be considered expired. In one embodiment, the message may be considered expired after a freshness value for the message and/or corresponding event has decayed sufficiently, e.g., in comparison to a threshold value. The freshness value may decay over time as a function of an elapsed time and/or number of delivery attempts. The threshold value may vary as a function of any suitable characteristics of the event.

Information indicative of expired messages 821 and/or related events may be stored in an archive 820. The archive 820 may be implemented using any suitable storage technologies for managing persistent storage. The archive 820 may be provided by one or more services and/or implemented using resources of the provider network 170. Although the archive 820 is shown outside of the rule evaluation system 100 for purposes of illustration and example, it is contemplated that the archive 820 may instead be implemented inside the rule evaluation system, e.g., using storage resources managed by the rule evaluation system. In the archive 820, any of the expired messages 821 may be represented using all or part of an undelivered message, all or part of the event related to the undelivered message, and/or any other suitable information. In one embodiment, suitable error information and/or diagnostic information may be stored for the expired messages 821 in the archive 820.

Clients such as clients 871A through 871N may access the expired messages 821 in the archive 820. The clients 871A-871N may represent computing devices operated by clients (including individual users, business entities, and/or other groups) of the provider network 170. A client may be granted access to the expired message in the archive for a period of time. In one embodiment, the client may be granted access for an indefinite period of time. The client may be granted access to a particular expired message on any suitable basis. In one embodiment, the client may be granted access if the client's resource(s) were the subject of the event. In one embodiment, the client may be granted access if the client's rule pattern(s) were matched by the event. In one embodiment, the client may be granted access if the client was the intended recipient of the undelivered message.

Figure 12:
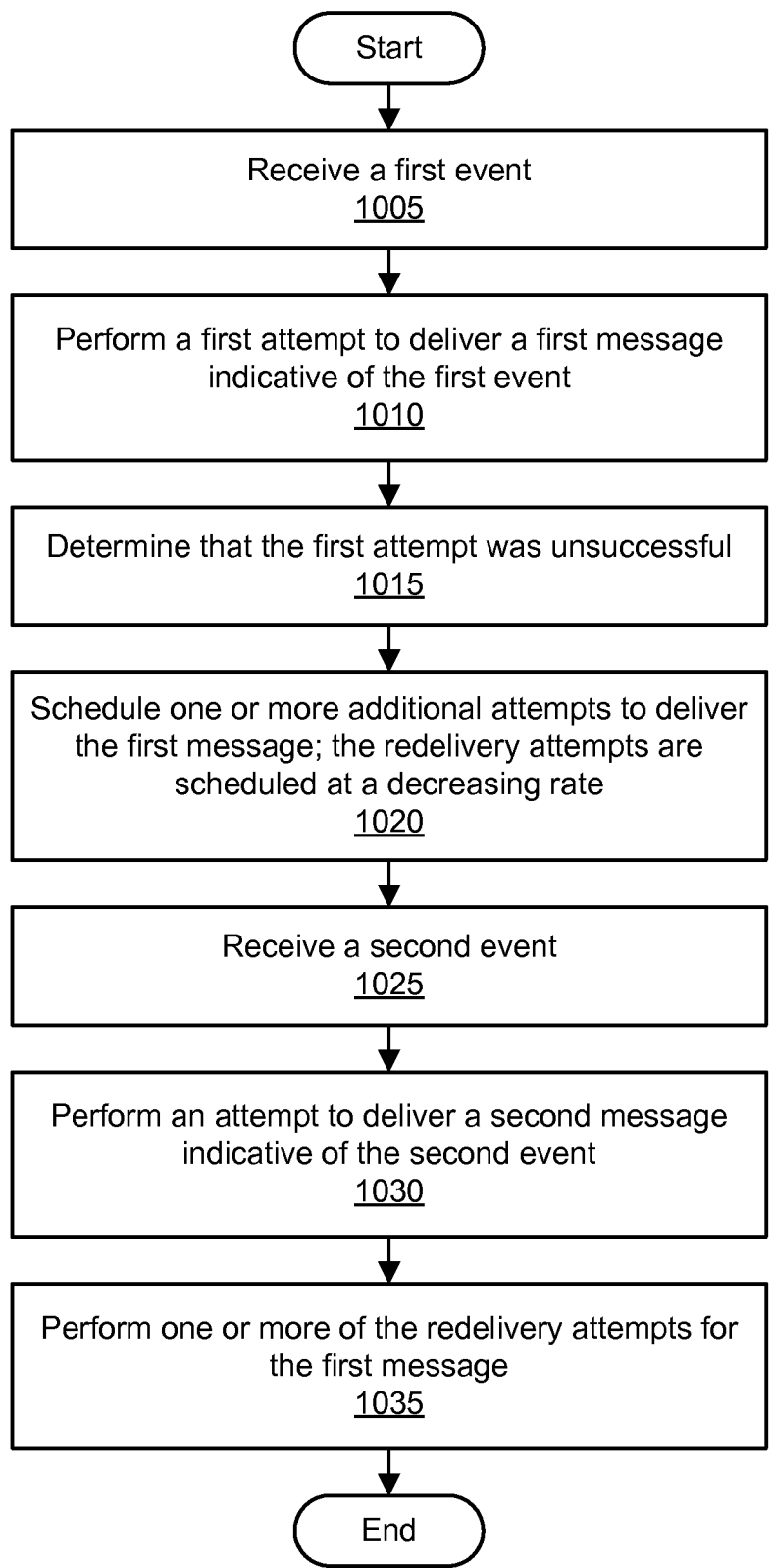
FIG. 12 is a flowchart illustrating a method for freshness-sensitive message delivery in which delivery of messages for later-received events is not delayed by attempted redelivery of messages for earlier-received events, according to some embodiments.

FIG. 12 is a flowchart illustrating a method for freshness-sensitive message delivery in which delivery of messages for later-received events is not delayed by attempted redelivery of messages for earlier-received events, according to some embodiments. As shown in 1005, a first event may be received. The first event may describe one or more resources, such as changes to the resource(s) or the status of the resource(s), in a provider network. The first event may be received in an event stream by an event reader at a first point in time. The event reader may be included in or coupled to a rule evaluation system, and the rule evaluation system may determine that the first event matches one or more rule patterns.

A first message may be generated such that the message is indicative of the first event. For example, the first message may encapsulate the first event or may include relevant portions of the first event. In one embodiment, the first message may also include one or more actions or action configurations representing instructions for one or more actions to be implemented by a recipient of the first message (e.g., based on contents of the first event). In one embodiment, the first message may be generated as a result of the event matching the one or more rule patterns, e.g., as determined by the rule evaluation system.

As shown in 1010, a first attempt to deliver the first message may be performed. The target of the first attempt to deliver the message may be an action handler or other intended recipient, e.g., a computing device coupled to the rule evaluation system over a network. As shown in 1015, it may be determined that the first attempt to deliver the first message was unsuccessful. The failure of the first attempt may be determined by receipt of an error indication, by a timeout of the delivery attempt, and/or through any other suitable mechanism. The cause of the unsuccessful delivery attempt may be the failure or unavailability of the intended recipient, the failure of unavailability of one or more networks or components thereof, and/or any other suitable cause.

As shown in 1020, one or more additional attempts to deliver the first message may be scheduled. The additional attempts may represent redelivery attempts. The redelivery attempts may be scheduled over a period of time after the unsuccessful first attempt to deliver the first message. The redelivery attempts may be scheduled at a decreasing rate, such that the duration between attempts may tend to increase over time. In one embodiment, the redelivery attempts may be scheduled using an exponential backoff algorithm. The exponential backoff algorithm may multiplicatively decrease the rate of the redelivery attempts. The redelivery attempts may be scheduled one at a time, such that a subsequent attempt may be scheduled only after an earlier attempt fails. In one embodiment, a redelivery attempt may be scheduled by storing information indicative of the first message and/or first event in a suitable data store or queuing system with an indication of the scheduled time to attempt redelivery.

As shown in 1025, a second event may be received. The second event may describe one or more resources, such as changes to the resource(s) or the status of the resource(s), in the provider network. The second event may be received in the event stream by the event reader at a second point in time. Although FIG. 12, for purposes of example, illustrates the second event as being received after the operation shown in 1020, it is contemplated that the second event may be received at substantially any point in time after the first event is received but before one or more redelivery attempts are performed for the first message. The rule evaluation system may determine that the second event matches one or more rule patterns.

A second message may be generated such that the message is indicative of the second event. For example, the second message may encapsulate the second event or may include relevant portions of the second event. In one embodiment, the second message may also include one or more actions or action configurations representing instructions for one or more actions to be implemented by a recipient of the second message (e.g., based on contents of the second event). In one embodiment, the second message may be generated as a result of the event matching the one or more rule patterns, e.g., as determined by the rule evaluation system.

As shown in 1030, an attempt to deliver the second message may be performed. The target of the attempt to deliver the second message may be an action handler or other intended recipient, e.g., a computing device coupled to the rule evaluation system over a network. The intended recipient of the second message may be the same intended recipient as the first message or may instead be a different intended recipient. In various embodiments, the attempt to deliver the second message may be successful or unsuccessful. If the attempt to deliver the second message is unsuccessful, then one or more redelivery attempts may be scheduled for the second message, e.g., in a similar manner as discussed above with respect to the first message. The intended recipient such as an action handler may perform one or more actions upon successful receipt of the second message, e.g., as specified in the second message.

The attempt to deliver the second message may not be delayed or blocked by any of the redelivery attempts for the first message. As shown in 1035, one or more of the redelivery attempts for the first message may be performed. Performing a redelivery attempt may include attempting to send the same message to the same recipient as the original attempt. In various embodiments, an attempt to redeliver the first message may be successful or unsuccessful. If an attempt to redeliver the first message is unsuccessful, then one or more additional redelivery attempts may be scheduled for the first message, e.g., in a similar manner as discussed above with respect to the operation shown in 1020. The intended recipient such as an action handler may perform one or more actions upon successful receipt of the first message, e.g., as specified in the first message.

In one embodiment, a plurality of redelivery attempts may be performed for a message over a period of time, e.g., at a decreasing rate. In one embodiment, after a particular number of unsuccessful attempts to a deliver a message, the message may be considered expired. In one embodiment, after a particular duration between delivery attempts without successful delivery of a message, the message may be considered expired. In one embodiment, after a particular duration since receipt of the event without successful delivery of a message, the message may be considered expired. Information indicative of the expired message and/or the related event may be stored in an archive. In one embodiment, suitable error information and/or diagnostic information may be stored for the message and/or event in the archive. A client may be granted access to the expired message and/or related event in the archive for a period of time. In one embodiment, the client may be granted access for an indefinite period of time. The client may represent a client of the provider network whose resource(s) were the subject of the event, whose rule pattern(s) were matched by the event, and/or who was the intended recipient of the undelivered message.

Figure 13:
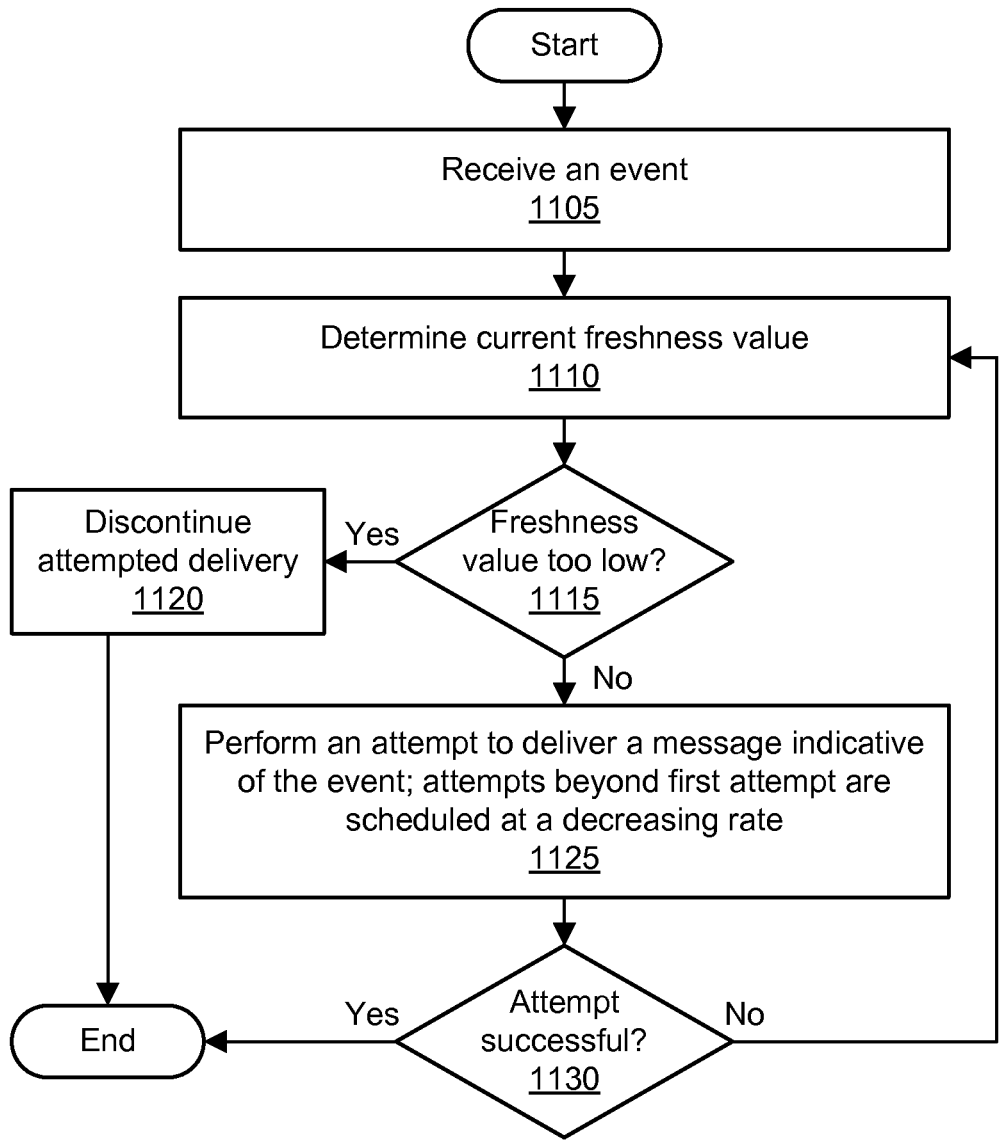
FIG. 13 is a flowchart illustrating a method for freshness-sensitive message delivery, including a determination of freshness value, according to some embodiments.

FIG. 13 is a flowchart illustrating a method for freshness-sensitive message delivery, including a determination of freshness value, according to some embodiments. As shown in 1105, an event may be received. The event may describe one or more resources, such as changes to the resource(s) or the status of the resource(s), in a provider network. The event may be received in an event stream by an event reader. The event reader may be included in or coupled to a rule evaluation system, and the rule evaluation system may determine that the event matches one or more rule patterns.

A message may be generated such that the message is indicative of the event. For example, the message may encapsulate the event or may include relevant portions of the event. In one embodiment, the message may also include one or more actions or action configurations representing instructions for one or more actions to be implemented by a recipient of the message (e.g., based on contents of the event). In one embodiment, the message may be generated as a result of the event matching the one or more rule patterns, e.g., as determined by the rule evaluation system.

As shown in 1110 through 1130, delivery of the message may be attempted repeatedly until the delivery succeeds or until a freshness value decays sufficiently to discontinue the attempted delivery. As shown in 1110, a current freshness value may be determined. The freshness value may be determined relative to a particular point in time. The freshness value may relate to the event and/or the message. In one embodiment, the freshness value may be determined based (at least in part) on an elapsed time for the event and/or message. The elapsed time may represent a duration of time since the event was generated, a duration of time since the event was received (e.g., by a rule evaluation system and/or event reader), a duration of time since the message was generated, and/or any other suitable chronological metric. In one embodiment, the freshness value may be determined based (at least in part) on a number of attempts to deliver the message. The freshness value may decay over time, e.g., as the elapsed time changes. In various embodiments, the decay may be linear or nonlinear. Accordingly, the operation shown in 1110 may generate a different freshness value for the same message or event when performed repeatedly over time.

As shown in 1115, it may be determined whether the freshness value is sufficient to attempt delivery of the message. In one embodiment, it may be determined whether the freshness value is sufficiently low to discontinue attempted delivery of the message. Conversely, the determination shown in 1115 may represent a determination as to whether the freshness value is sufficiently high to continue attempted delivery of the message. In making the determination shown in 1115, the freshness value may be compared to a threshold value, and the threshold value may be determined based (at least in part) on one or more characteristics of the event. As used herein, the characteristics of the event may generally include any content or components of the event (including any field names and/or field values), any headers for the event, any metadata for the event, any description of the event type, a source of the event, or any other suitable information characterizing the event. The characteristic(s) of the event may relate to a quality of service (QoS) guarantee for the event for timely delivery of the message, e.g., a guarantee that the event will be delivered within a particular period of time starting from its generation or receipt. Accordingly, the time and/or number of attempts allowed for delivering messages may vary based on the characteristics of the corresponding events.

As shown in 1120, if the freshness value is sufficiently low (e.g., if the freshness value is less than the threshold value), then the attempted delivery of the message may be discontinued. When attempted delivery is discontinued due to a low freshness value, the message and/or event may be considered expired. In one embodiment, information indicative of an expired event may be stored in an archive, and the information indicative of the expired event may accessible in the archive to a client.

As shown in 1125, if the freshness value is sufficiently high (e.g., if the freshness value is not less than the threshold value), then an attempt to deliver the message may be performed. The target of the attempt to deliver the message may be an action handler or other intended recipient, e.g., a computing device coupled to a rule evaluation system over a network. In one embodiment, a first attempt to deliver the message may be performed without substantial delay, e.g., as soon as possible after receipt of the event and generation of the message. The first attempt to deliver the message may not be delayed or blocked for redelivery attempts for other messages. In one embodiment, the first attempt to deliver the message may be performed without regard to a freshness value.

For attempts beyond the first attempt (e.g., redelivery attempts), the attempts may be scheduled for future points in time. The redelivery attempts may be scheduled at a decreasing rate, such that the duration between attempts may tend to increase over time. In one embodiment, the redelivery attempts may be scheduled using an exponential backoff algorithm. The exponential backoff algorithm may multiplicatively decrease the rate of the redelivery attempts. The redelivery attempts may be scheduled one at a time, such that a subsequent attempt may be scheduled only after an earlier attempt fails. In one embodiment, a redelivery attempt may be scheduled by storing information indicative of the message and/or event in a suitable data store or queuing system with an indication of the scheduled time to attempt redelivery.

As shown in 1130, it may be determined whether the attempt to deliver the message was successful or unsuccessful. If the attempt was successful, then the method may end. The failure of the attempt may be determined by receipt of an error indication, by a timeout of the delivery attempt, and/or through any other suitable mechanism. The cause of the unsuccessful delivery attempt may be the failure or unavailability of the intended recipient, the failure of unavailability of one or more networks or components thereof, and/or any other suitable cause. If the attempt to deliver the message was unsuccessful, then the method may proceed with the operation shown in 1110 to determine a revised freshness value at the current point in time.

Message Envelopes for Heterogeneous Messages

Figure 14:
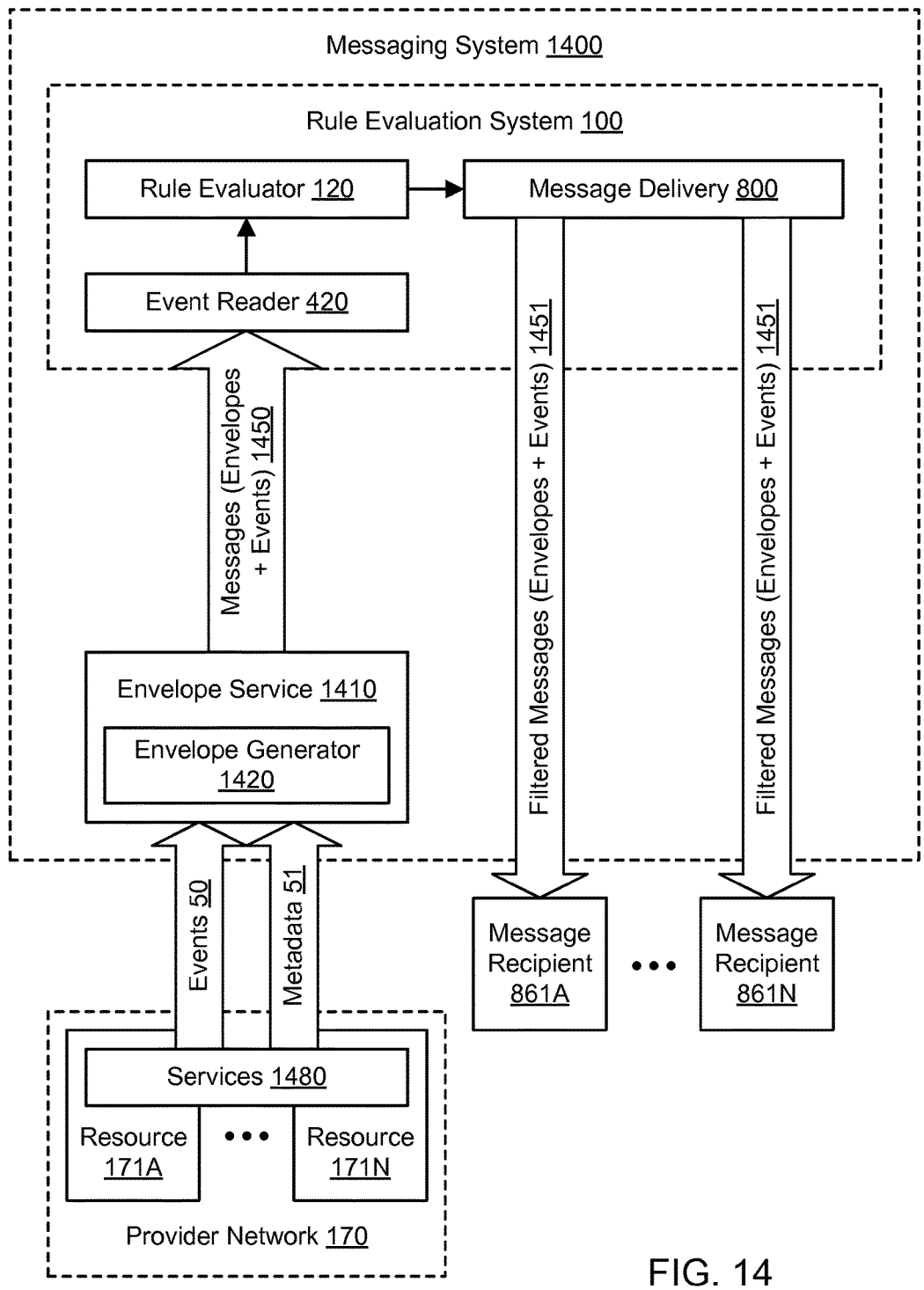
FIG. 14 illustrates an example system environment for generating message envelopes for heterogeneous events in a provider network, according to some embodiments.

FIG. 14 illustrates an example system environment for generating message envelopes for heterogeneous events in a provider network, according to some embodiments. A messaging system 1400 may include components for generating, processing, and/or receiving messages, such as the rule evaluation system. The messaging system 1400 may also include an envelope service 1410 that generates messages 1450 based on the events 50 and/or event metadata 51. The envelope service 1410 may include any suitable components for processing event metadata 51, including an envelope generator 1420. The envelope service 1410 may generate messages 1450 that include the events 50 along with message envelopes that may represent metadata 51 for the events. The message envelopes for a plurality of messages 1450 may be expressed in a common format (e.g., including the same set of fields) to facilitate the standardized processing of messages that encapsulate heterogeneous events.

As discussed above, events 50 may be generated that describe resources, such as changes to the resources or the status of the resources, in a provider network 170. The provider network 170 may represent a multi-tenant environment in which services and resources are used by a plurality of clients referred to as tenants. The messaging system 1400 may be said to be deployed in a multi-tenant environment. The events 50 may be generated by a plurality of services 1480, e.g., based on monitoring of the resources 171A-171N. In one embodiment, various ones of the services 1480 may generate various ones of the events 50 that vary in the format of their content, such that different events may be formatted using different content schemas. In one embodiment, a content schema for an event may describe or indicate a type of content and/or a hierarchical structure of content for the event, such as one or more field names (identifying fields of the event) and a structure thereof. As shown in FIG. 5, for example, the field names may differ between events 50A and 50B. The content schemas for events may be service-specific and may vary from service to service. In one embodiment, the same resource (e.g., resource 171A) may be the subject of two different events that have different content schemas, either generated by the same service or by different services.

In one embodiment, the events 50 may be received by the envelope service 1410 from the services 1480 using an application programming interface (API). The services 1480 may be said to call or invoke the API for the envelope service 1410. It is contemplated that customers of the provider network may also invoke the functionality of the envelope service 1410 to generate messages with events and message envelopes, e.g., by using the API or other interface to the envelope service. To use the envelope service 1410 to generate a message for a particular event, a service may supply both the event (e.g., the content of the event including one or more field names and associated field values) and metadata associated with the event. The metadata supplied by a service may characterize aspects of the corresponding event and may include field values for one or more fields in an envelope schema. The envelope schema may include one or more fields characterized by field names. In one embodiment, the envelope schema may include mandatory fields and optional fields. The same envelope schema may be used to generate the message envelopes for a plurality of events, including events that have different content schemas.

For each of the events 50 and associated metadata 51 provided by the services 1480 as input to the envelope service 1410, the envelope generator 1420 may generate a message envelope. The message envelope may include one or more field names and associated field values that collectively represent a set of fields. In one embodiment, the field names may be the same for different message envelopes due to the use of the common envelope schema, but the field values in the message envelopes may differ. Not all field names may have field values in a particular message envelope, e.g., for optional fields. The envelope service 1410 may generate and send messages 1450, and each of the messages may include a message envelope and the event corresponding to the message envelope. In one embodiment, the events 50 and the resulting messages 1450 may be represented using a structured, hierarchical format such as JSON or XML. Within a particular message, elements (e.g., fields) of a message envelope may be placed in any suitable location relative to elements (e.g., fields) of the event. For example, the message envelope (or portions thereof) may be located at the beginning of the message or at the end of the message.

The envelope service 1410 may send the messages 1450 to one or more recipients using any suitable network and routing technologies. In one embodiment, the envelope service 1410 may deliver messages to subscribers, e.g., services or customers who have subscribed to messages having particular field values for particular fields. In one embodiment, the envelope service 1410 may send the messages 1450 to the rule evaluation system 100. The rule evaluation system may receive the messages 1450 using the event reader 420 and analyze the messages for potential matches of rule patterns using the rule evaluator 120. In one embodiment, the rule evaluator 120 may attempt to match rule patterns against the fields of the message envelopes and/or the fields of the events. The rule evaluator may thus filter the incoming messages 1450 to produce a smaller set of filtered messages 1451 that match various rule patterns. The rule evaluator may also produce messages 1451 that include portions of events rather than entire events. The filtered messages 1451 may be delivered to message recipients (e.g., recipients 861A-861N) using the message delivery component 800. In one embodiment, the filtered messages 1451 may also include the message envelopes along with the events. However, it is contemplated that messages (including messages 1450 and/or filtered messages 1451) may be delivered to particular recipients with or without the message envelopes, e.g., based on a configuration parameter specified by individual recipients.

The messaging system 1400 and the envelope service 1410 may be implemented using one or more computing devices, any of which may be implemented by the example computing device 3000 illustrated in FIG. 19. In various embodiments, portions of the functionality of the messaging system 1400 and/or the envelope service 1410 may be provided by the same computing device or by any suitable number of different computing devices. If any of the components of the messaging system 1400 and/or the envelope service 1410 are implemented using different computing devices, then the components and their respective computing devices may be communicatively coupled, e.g., via a network. Each of the illustrated components may represent any combination of software and hardware usable to perform their respective functions. It is contemplated that the messaging system 1400 and/or the envelope service 1410 may include additional components not shown, fewer components than shown, or different combinations, configurations, or quantities of the components shown.

Figure 15A:
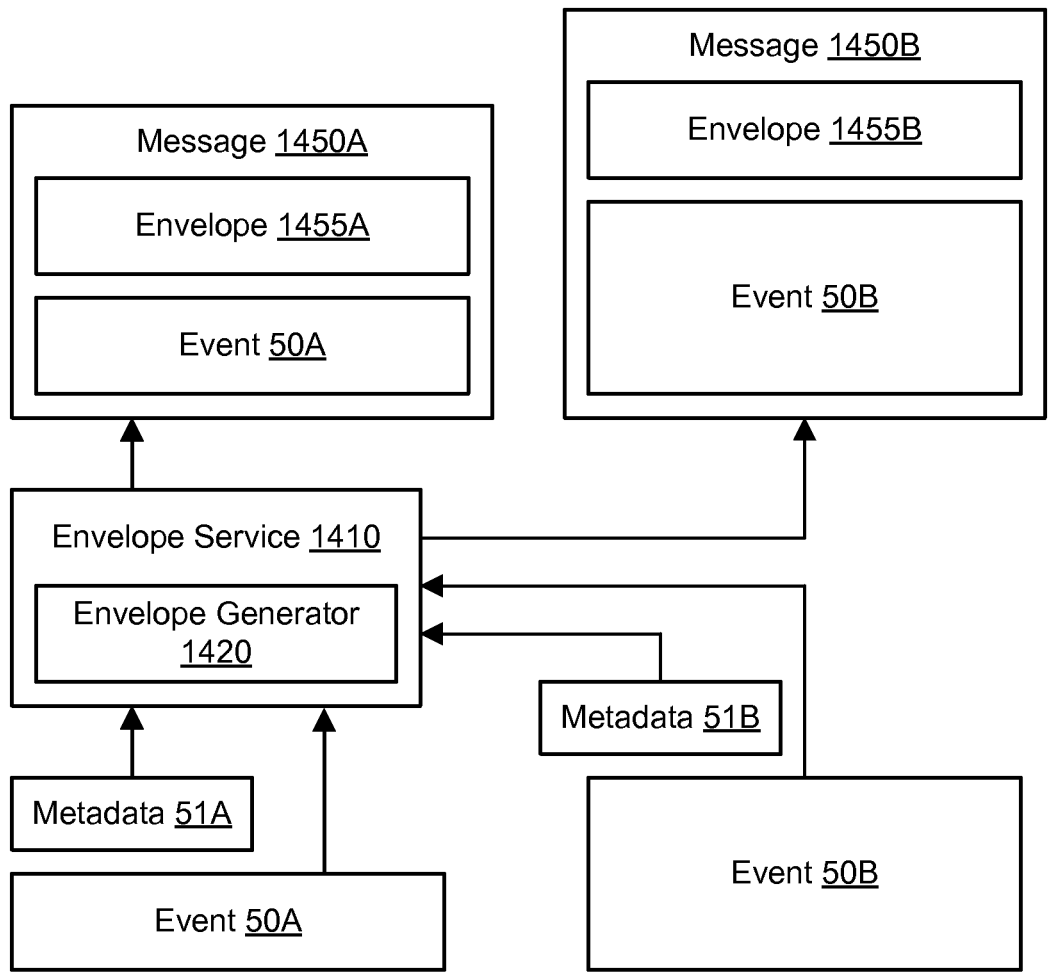
FIG. 15A and FIG. 15B illustrate further aspects of the example system environment for generating message envelopes for heterogeneous events in a provider network, including examples of messages generated based on events, according to some embodiments.
Figure 15B:
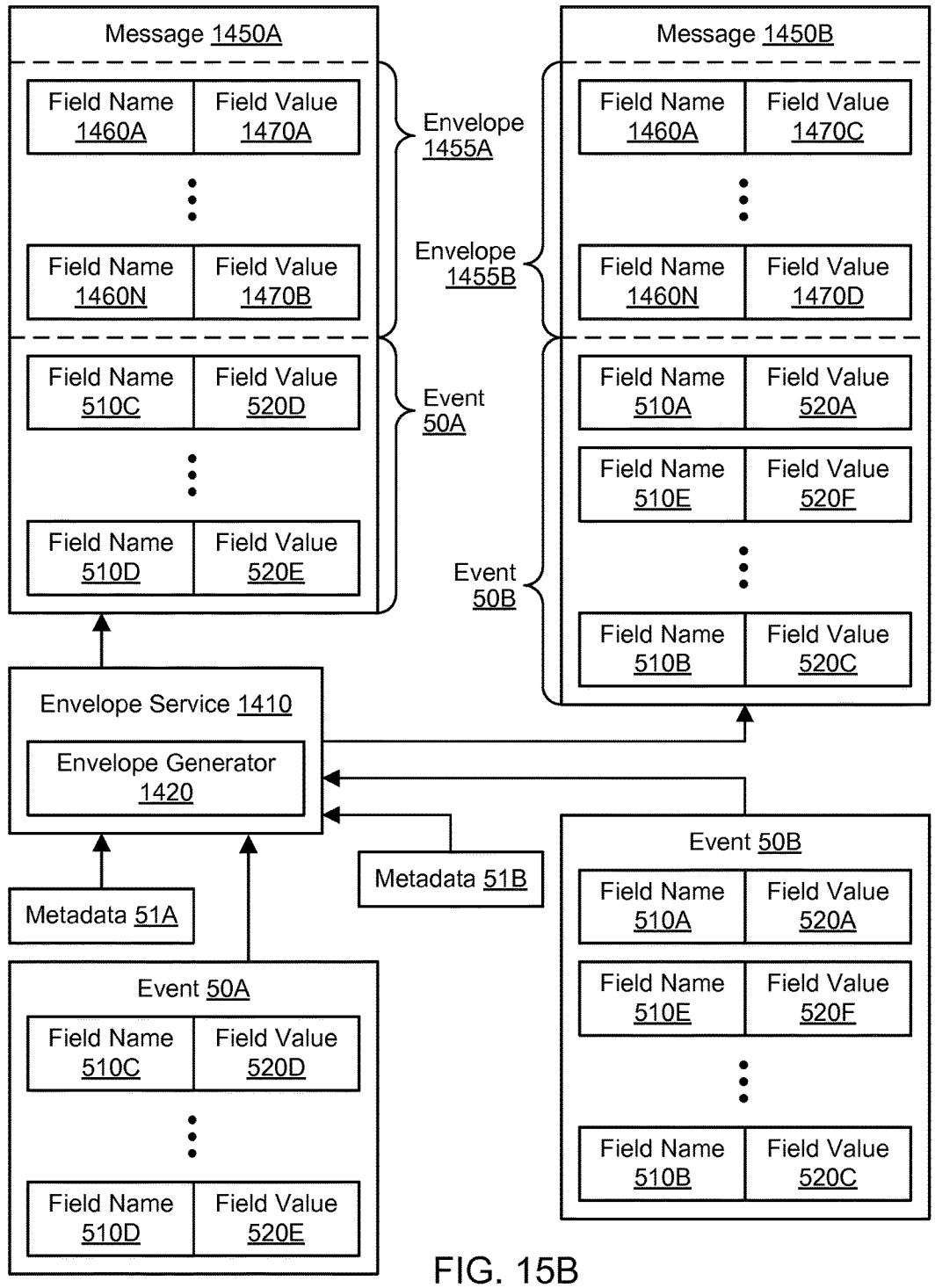

FIG. 15A and FIG. 15B illustrate further aspects of the example system environment for generating message envelopes for heterogeneous events in a provider network, including examples of messages generated based on events, according to some embodiments. As shown in the example of FIG. 15A, the envelope service 1410 may take an event 50A and associated metadata 51A as input. The event 50A and metadata 51A may be provided to the envelope service 1410 by an originating service in a service-oriented system, e.g., the service that generated the event 50A. Based on the metadata 51A, the envelope generator 1420 may generate a message envelope 1455A. The message envelope 1455A may be generated based on an envelope schema that defines a set of fields, and the metadata 51A may represent field values for at least some of the fields in the envelope schema. The envelope schema for the message envelope 1455A may include both mandatory and optional fields. In one embodiment, the envelope generator 1420 may return an error and fail to generate the message envelope 1455A if suitable values are not supplied for all of the mandatory fields, e.g., in an API call from the originating service. In one embodiment, the envelope generator 1420 may populate one or more of the fields in the message envelope 1455A without direct input (e.g., metadata 51A) from the service that supplied the event 50A. For example, the envelope generator 1420 may populate fields in the message envelope 1455A for a version identifier of the envelope, a unique identifier for the event, a timestamp of the event's arrival at the envelope service, a region in which the event was generated, and so on. The envelope service 1410 may generate and send a message 1450A that includes both the message envelope 1455A and the event 50A.

Similarly, as shown in the example of FIG. 15A, the envelope service 1410 may take an event 50B and associated metadata 51B as input. The event 50B and metadata 51B may be provided to the envelope service 1410 by an originating service in a service-oriented system, e.g., the service that generated the event 50B. The events 50A and 50B may be provided by the same service or by different services. The events 50A and 50B may represent different content schemas, and thus their fields and/or hierarchical structure may differ. Based on the metadata 51B, the envelope generator 1420 may generate a message envelope 1455B. The message envelope 1455B may be generated based on the same envelope schema that defines the same set of fields, and the metadata 51B may represent field values for at least some of the fields in the envelope schema. Again, the envelope schema for the message envelope 1455B may include both mandatory and optional fields. In one embodiment, the envelope generator 1420 may return an error and fail to generate the message envelope 1455B if suitable values are not supplied for all of the mandatory fields, e.g., in an API call from the originating service. In one embodiment, the envelope generator 1420 may populate one or more of the fields in the message envelope 1455B without direct input (e.g., metadata 51B) from the service that supplied the event 50B. For example, the envelope generator 1420 may populate fields in the message envelope 1455B for a version identifier of the envelope, a unique identifier for the event, a timestamp of the event's arrival at the envelope service, a region in which the event was generated, and so on. The envelope service 1410 may generate and send a message 1450B that includes both the message envelope 1455B and the event 50B.

FIG. 15B illustrates a more detailed version of the example shown in FIG. 15A. Each event may include one or more field names based on a content schema for the particular event. For each field name, the event may include one or more field values. As discussed above with respect to FIG. 5, event 50A may include a field name 510C and associated field value 520D as well as a field name 510D and associated field value 520E. Field names and their associated values in events 50 may generally describe characteristics or attributes of resources in the provider network 170. In some cases, a field name in an event may include a nested or otherwise hierarchical structure that may be flattened prior to rule evaluation against the event. The event 50A may also include other field names (not shown), as indicated by the ellipsis. As another example, event 50B may include a field name 510A and associated field value 520A, a field name 510E and associated field value 520F, and a field name 510B and associated field value 520C. The event 50B may also include other field names (not shown), as indicated by the ellipsis.

Accordingly, the message 1450A may include one set of field names for the event 50A based on one content schema, while the message 1450B may include another set of field names (e.g., a set of field names that differs at least somewhat) for the event 50B based on another content schema. However, because the same envelope schema may be used to generate the message envelopes 1455A and 1455B, the set of field names for the envelope 1455A may be the same as the set of field names for the envelope 1455B. As shown in the example of FIG. 15B, each of the message envelopes may include a set of fields characterized by field names 1460A-1460N. It is contemplated that any suitable number and configuration of field names may be used in the message envelopes. The values for the field names 1460A-1460N may differ between the message envelopes 1455A and 1455B. As shown in the example of FIG. 15B, the message envelope 1455A may include a field value 1470A for the field name 1460A and a field value 1470B for the field name 1460N, while the message envelope 1455B may include a field value 1470C for the field name 1460A and a field value 1470D for the field name 1460N. At least some of the field values 1470A and 1470B for the message envelope 1455A may be populated based on the metadata 51A for the corresponding event 50A. Similarly, at least some of the field values 1470C and 1470D for the message envelope 1455B may be populated based on the metadata 51B for the corresponding event 50B. As discussed above, some of the field names 1460A-1460N may characterize mandatory fields while others of the field names 1460A-1460N may characterize optional fields. For optional fields in the message envelopes, the field values may be generated based on the metadata 51A and 51B, other input sources, and/or other analysis. Although the message envelopes 1455A and 1455B are illustrated as being higher or earlier in the respective messages 1450A and 1450B than the respective events 50A and 50B, e.g., as headers, it is contemplated that elements (e.g., fields) of a message envelope may be placed in any suitable location relative to elements (e.g., fields) of the related event.

In one embodiment, the content of the event may be represented as a detail field in the resulting message. The detail field may include one or more field names and associated field values. The detail field may include nested fields within a hierarchical structure having any suitable number of hierarchical levels. The content schemas for events may be service-specific, such that each originating service may arbitrarily define the structure (e.g., field names and hierarchy) for the detail field for an event. In some circumstances, information in the detail field may duplicate information in the message envelope.

In one embodiment, the fields in the envelope schema (and thus in the message envelopes generated according to the envelope schema) may include a version number of the message envelope. The version number may be fixed and unchanging from envelope to envelope. In one embodiment, the fields in the envelope schema (and thus in the message envelopes generated according to the envelope schema) may include a timestamp of the event's occurrence. The timestamp of the event's occurrence may be optionally provided by the originating service. In one embodiment, the timestamp of the event's occurrence may represent a global timestamp, e.g., as generated by a global time server such that timestamps are generated on a consistent basis for messages of differing origins. In various embodiments, the global timestamp may be mandatory or optional in the message envelope. In one embodiment, the fields in the envelope schema (and thus in the message envelopes generated according to the envelope schema) may include a timestamp of the event's arrival at the envelope service. The timestamp of the event's arrival at the envelope service may be determined by the envelope service itself. In one embodiment, the fields in the envelope schema (and thus in the message envelopes generated according to the envelope schema) may include a unique identifier of the event (e.g., unique within the context of the messaging system 1400). The unique identifier be determined by the envelope service itself.

In one embodiment, the fields in the envelope schema (and thus in the message envelopes generated according to the envelope schema) may include an account identifier or user identifier, e.g., for a customer account with the provider network. The account identifier or user identifier may identify an individual user, organization, project, or other entity. The account identifier or user identifier may be provided by the originating service or by a customer of the provider network. The account identifier or identifier may also specify one or more roles for a user (including an individual user or other entity). A role may include permissions or other security credentials that permit the user to perform particular tasks and/or have access to a set of resources at run-time.

In one embodiment, the fields in the envelope schema (and thus in the message envelopes generated according to the envelope schema) may include a source identifier, e.g., for the originating service. The source identifier may be provided by the originating service or by a customer of the provider network. In one embodiment, the fields in the envelope schema (and thus in the message envelopes generated according to the envelope schema) may include one or more resource identifiers for resources of the provider network that are affected by the event. The resource identifier(s) may be optionally provided by the originating service. In one embodiment, the fields in the envelope schema (and thus in the message envelopes generated according to the envelope schema) may include one or more tags. The tags may represent customer-applied descriptions of resources in the provider network and may be optionally provided by the originating service. In one embodiment, the fields in the envelope schema (and thus in the message envelopes generated according to the envelope schema) may include a region identifier, e.g., for the originating service. The region identifier may represent a particular region of the provider network and may be determined by the envelope service itself.

In one embodiment, the fields in the envelope schema (and thus in the message envelopes generated according to the envelope schema) may include a detail-type identifier. The detail-type identifier may identify the structure of the event (e.g., of the detail field of the message) and may be provided by the originating service. Within the messaging system 1400, a central registry of content schemas for events may not exist. However, one or more fields in the envelope schema may be used to identify the content schema of a detail field. In one embodiment, a source field and a detail-type field in the message envelope may collectively identify the content schema of the detail field for the message.

In one embodiment, the fields in the envelope schema (and thus in the message envelopes generated according to the envelope schema) may also include a checksum for the message. The checksum may be determined by the envelope service itself. The checksum may be calculated based on a flattened version of the message, e.g., a version that eliminates a nesting of fields.

The envelope service 1410 may generate message envelopes for multiple events that share the same content schema. For example, the multiple events may be produced by the same service such that the detail field of the events may share the same structure and field names. Additionally, as described above, the message envelopes for the multiple events may share the same envelope schema such that the same set of fields may be present in the message envelopes for all of the events. However, at least some of the field values may differ among the multiple events. The differing field values may be present in the detail field and/or in the message envelope.

Figure 16:
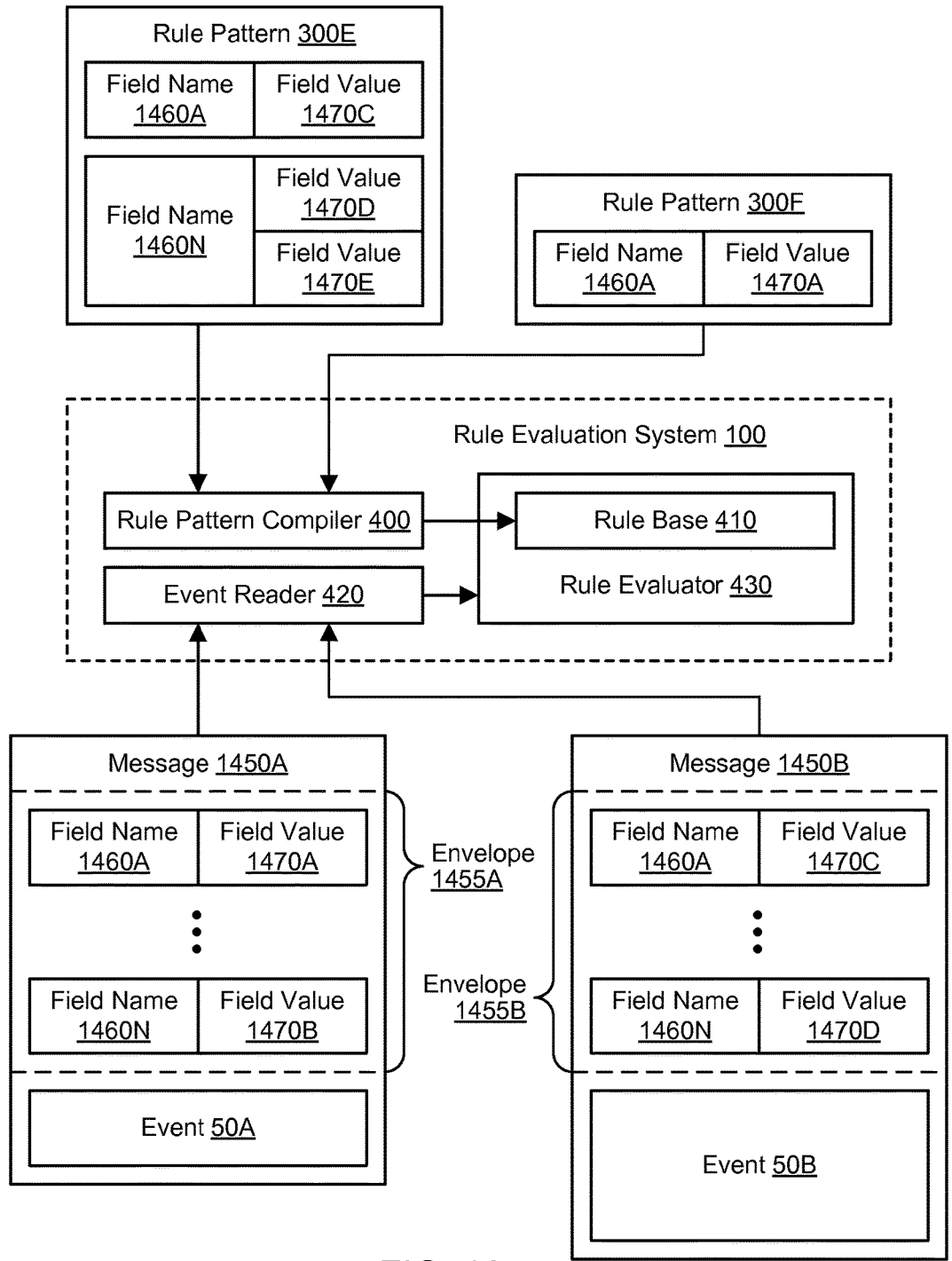
FIG. 16 illustrates further aspects of the example system environment for rule evaluation in a provider network, including evaluation of rule patterns against message envelopes, according to some embodiments.

FIG. 16 illustrates further aspects of the example system environment for rule evaluation in a provider network, including evaluation of rule patterns against message envelopes, according to some embodiments. Rule patterns 300E and 300F represent examples of rule patterns that may be compiled into the rule base 410. Each rule pattern may include one or more field names. For each field name, the rule pattern may include one or more field values. For example, rule pattern 300E may include a first field name 1460A and an associated field value 1470C. Rule pattern 300E may also include a second field name 1460N and two associated field values 1470D and 1470E. Field names and their associated values may generally describe characteristics or attributes of resources in the provider network 170. In some cases, a field name may include a nested or otherwise hierarchical structure that may be flattened during compilation of the rule patterns. The rule evaluation system 100 may evaluate potential matches based on arbitrary or user-defined Boolean combinations of field names and/or field values. For example, in one embodiment, for the rule pattern 300E to be matched by an event, all of the field names 1460A and 1460N should be present in the event; however, any one of the field values for a field name (e.g., either value 1470D or value 1470E for field name 1460N) may satisfy the conditions represented by the rule pattern. As another example, rule pattern 300F may include the first field name 1460A and an associated field value 1470A. In one embodiment, for the rule pattern 300F to be matched by an event, the field name 1460A and associated field value 1470N should be present in the event.

In one embodiment, the field names 1460A and 1460N in the rule patterns 300E and 300F may correspond to field names in the envelope schema. Accordingly, the rule evaluator 430 may attempt to match events to rule patterns based on the message envelopes associated with the events. In one embodiment, the rule evaluator 430 may examine each message envelope and/or event only for field names matching one or more rule patterns and may disregard other field names present in the envelope and/or event. For example, when the message 1450A is received, the rule evaluator 430 may evaluate the rule patterns 300E and 300F against the message using the rule base 410. The message 1450A may match the rule pattern 300F because the message envelope 1455A includes the field name 1460A and associated field value 1470A described in the rule pattern. In one embodiment, once the name 1460A and value 1470A are found in the envelope 1455A, the rule evaluator 430 may determine that the rule pattern 300D has been matched by the message 1450A. The rule evaluator 430 may determine that the rule pattern 300E is not matched by the message 1450A once the field value 1470C is not found in the message for the field name 1460A. If the rule base captures only the rules 300E and 300F, then the rule evaluator 430 may examine the message 1450A only for field names 1460A and 1460N and may disregard other field names in the message (such as any field names within the event 50A and any other field names within the message envelope 1455A).

As another example, when the message 1450B is received, the rule evaluator 430 may evaluate the rule patterns 300E and 300F against the message using the rule base 410. The message 1450B may match the rule pattern 300E because the message envelope 1455B includes the field name 1460A and associated field value 1470C as well as the field name 1460N and one of the acceptable field values 1470D described in the rule pattern. The rule evaluator 430 may determine that the rule pattern 300F is not matched by the message 1450B once the field value 1470A is not found in the message for the field name 1460A. If the rule base captures only the rules 300E and 300F, then the rule evaluator 430 may examine the message 1450B only for field names 1460A and 1460N and may disregard other field names in the message (such as any field names within the event 50B and any other field names within the message envelope 1455B).

In one embodiment, the message envelopes 1450A and 1450B may be represented initially using a structured, hierarchical format such as JSON or XML. In such a format, the envelopes 1450A and 1450B may include nested structures such that some field names may be represented by different name components across different levels of the hierarchy. Prior to evaluating events based on their related message envelopes, the rule evaluation system 100 may flatten the message envelopes. However, the flattening procedure may be avoided if the envelope schema does not include nested structures. In one embodiment, prior to evaluating events based on their related message envelopes, the rule evaluation system 100 may sort the field names within the message envelopes. In one embodiment, the field names within a message envelope may be sorted (e.g., alphabetically) upon being generated by the envelope generator 1420, e.g., based on a pre-sorted set of field names in the envelope schema. Accordingly, the sorting procedure may be avoided if the envelope schema specifies the fields in a sorted order.

Figure 17:
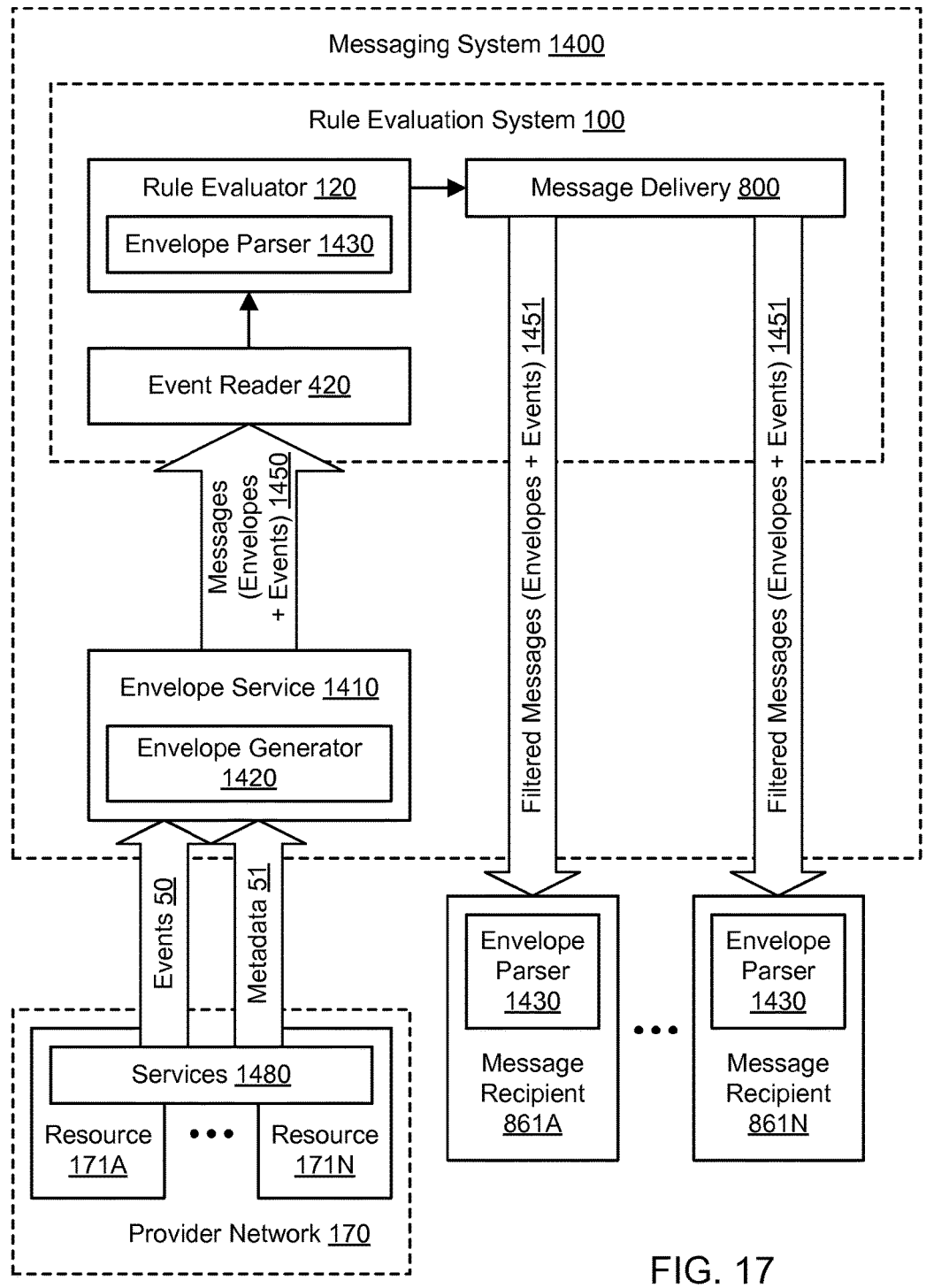
FIG. 17 illustrates further aspects of the example system environment for generating message envelopes for heterogeneous events in a provider network, including parsing message envelopes using an envelope parser, according to some embodiments.

FIG. 17 illustrates further aspects of the example system environment for generating message envelopes for heterogeneous events in a provider network, including parsing message envelopes using an envelope parser, according to some embodiments. In one embodiment, the use of a common format for message envelopes may permit any of the messages with a message envelope (including messages 1450 and filtered messages 1451) to be parsed using the same type of parser. As shown in the example of FIG. 17, different instances of an envelope parser 1430 may be used by different components of the messaging system 1400 to decode aspects of message envelopes produced by the envelope service 1410. For example, the rule evaluator 120 may include an instance of the envelope parser 1430 in order to determine the values for fields in message envelopes. Similarly, the message recipients 861A-861N may include instances of the envelope parser 1430 in order to determine the values for fields in message envelopes. The envelope parser 1430 may represent a library or package that includes one or more methods for parsing a message envelope. As used herein, parsing a message envelope may include analyzing the message envelope to break down the envelope into its individual fields and their values. In one embodiment, for each of the field names in the envelope schema, the envelope parser 1430 may include a method to obtain the value(s) (if any) associated with the field name in a particular message envelope. In one embodiment, the envelope parser 1430 may be implemented as an API of the envelope service 1410, such that clients of the envelope service 1410 can invoke functionality for generating messages and/or for parsing messages.

Figure 18:
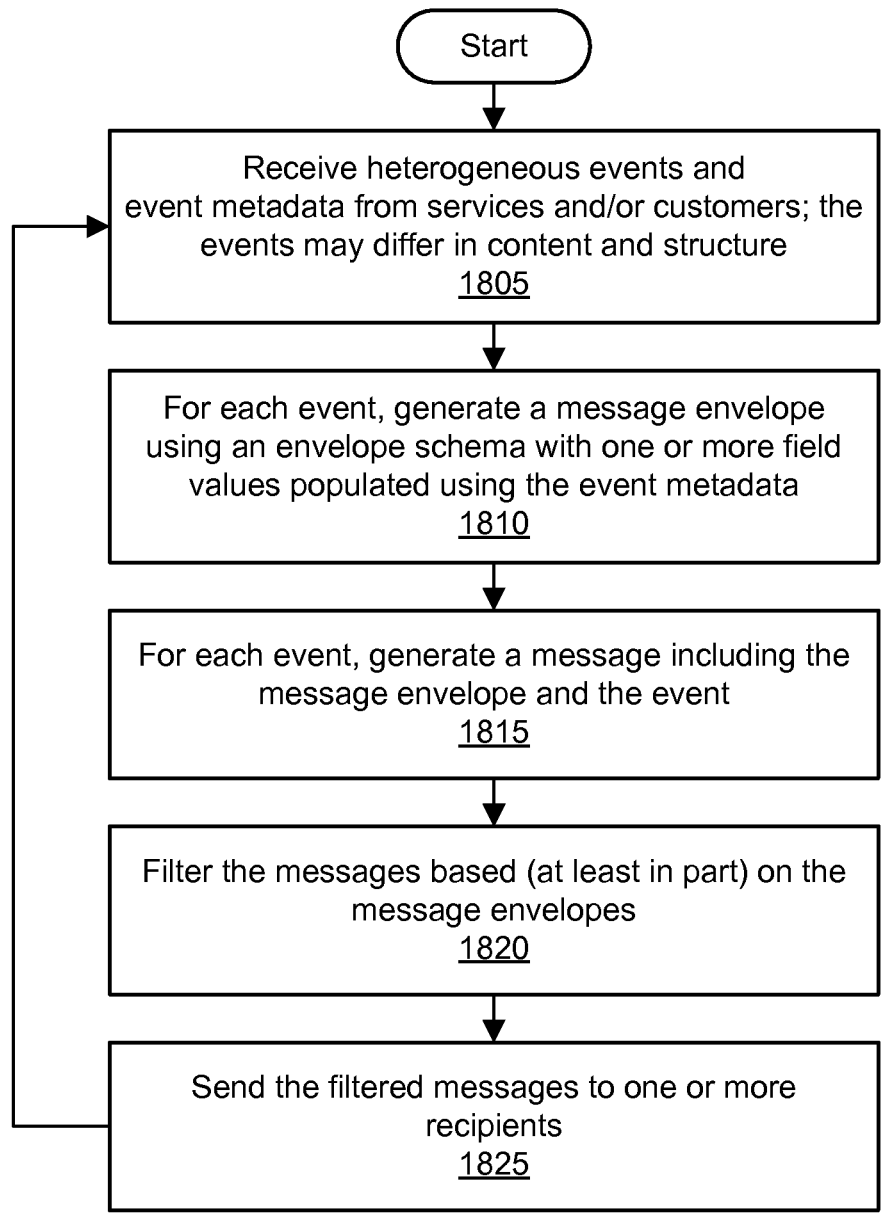
FIG. 18 is a flowchart illustrating a method for generating message envelopes for heterogeneous events, according to some embodiments.

FIG. 18 is a flowchart illustrating a method for generating message envelopes for heterogeneous events, according to some embodiments. As shown in 1805, a plurality of heterogeneous events may be received from a plurality of services and/or customers. The events may be received by an envelope service based on calls to an API for the envelope service. Event metadata characterizing the events may also be received with the events. The heterogeneous events may describe resource changes and/or other occurrences of interest (e.g., status updates), e.g., in resources of a provider network and/or in resources managed by one or more customers. In one embodiment, the term "heterogeneous" may generally indicate that various ones of the events may vary in the format of their content, such that different events may be formatted using different content schemas. In one embodiment, a content schema for an event may describe or indicate a type of content and/or a hierarchical structure of content for the event, such as one or more field names (identifying fields of the event) and a structure thereof. In one embodiment, the events received in 1805 may include an event formatted using a content schema and a different event formatted using a different content schema.

As shown in 1810, for each event, a message envelope may be generated. Each message envelope may be generated based on the same envelope schema. The envelope schema may not vary across a set of message envelopes even though the content schemas for individual events may vary. The envelope schema may include one or more field names. In generating the message envelope, the field values for one or more of the field names may be populated. The envelope schema may include mandatory fields and/or optional fields. Some of the fields in the message envelope may be populated based on values in the event metadata received with the event. For example, an event may be received from the originating service with a source identifier for the originating service, a detail-type identifier for a structure of one or more service-specific fields in the event, and a user identifier for a user (e.g., an individual user or other entity). A source field in the message envelope may be populated with the source identifier, a detail-type field in the message envelope may be populated with the detail-type identifier, and a user field in the message envelope may be populated with the user identifier. Others of the fields in the message envelope may be populated based on other sources or other analysis.

As shown in 1815, for each event, a message may be generated that includes the event and the corresponding message envelope. In one embodiment, the operation shown in 1815 may produce a message that includes a message envelope (based on the envelope schema) and an event (based on a content schema), and the operation shown in 1815 may also produce a different message that includes a different message envelope (based on the envelope schema) and a different event (based on a different content schema). The one or more field values in a message envelope may include, represent, or otherwise indicate an identification of the content schema of the associated event in the message. For example, a source identifier and a detail-type identifier may together indicate an identification of the content schema.

As shown in 1820, the messages may be filtered based (at least in part) on the message envelopes. Filtering the messages may include analyzing the messages for potential matches of rule patterns, e.g., using a rule evaluator. In one embodiment, the rule evaluator may attempt to match rule patterns against the fields of the message envelopes and optionally the fields of the events themselves (e.g., the contents of detail fields). The rule evaluator may thus filter the messages to produce a smaller set of filtered messages that match various rule patterns. As shown in 1825, the filtered messages may be sent to one or more recipients. Based on the common, standardized format for the message envelopes, a recipient of a message may be able to determine the values for fields in message envelopes for different messages (representing heterogeneous events) using a standardized technique (e.g., an envelope parser).

Illustrative Computer System

In at least some embodiments, a computer system that implements a portion or all of one or more of the technologies described herein may include a computer system that includes or is configured to access one or more computer-readable media. FIG. 19 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 19 may be used to implement the described functionality in various embodiments; for example, software components running on a variety of different devices and servers may collaborate to provide the functionality. In some embodiments, portions of the described functionality may be implemented using storage devices, network devices, or a variety of different computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
 a plurality of computing devices configured to implement a messaging system in a multi-tenant environment and a plurality of resources assigned to different tenants associated with respective accounts, wherein the messaging system is configured to:
  receive a plurality of heterogeneous events generated by a plurality of services of the multi-tenant environment that describe status of one or more of the resources, and wherein the heterogeneous events comprise an event generated by a first service in the plurality of services and formatted using a content schema, and a different event generated by a second service in the plurality of services and formatted using a different content schema;
  determine, from event metadata of the event received from the first service, a first account identifier identifying a first account, wherein the first account is assigned a first resource by the first service, wherein the event describes a status of the first resource;
  generate a message comprising a message envelope and the event, wherein the message envelope comprises a plurality of field names and one or more field values formatted using a standardized envelope schema, including the first account identifier;
  determine, from different event metadata of the different event received from the second service, a second account identifier identifying a second account, wherein the second account is assigned a second resource by the second service, wherein the different event describes a status of the second resource;
  generate a different message comprising a different message envelope and the different event, wherein the different message envelope comprises the plurality of field names and one or more different field values formatted using the standardized envelope schema, including the second account identifier;

parse the message envelope to determine the first account identifier and filter the message based at least in part on the message envelope and the first account identifier;

parse the different message envelope to determine the second account identifier and filter the different message based at least in part on the different message envelope and the second account identifier; and deliver the message and different message to one or more respective recipients based at least in part on the respective filtering of the message and the different message.

2. The system as recited in claim 1, wherein the one or more field values in the message envelope comprise an identification of the content schema, and wherein the one or more different field values in the different message envelope comprise an identification of the different content schema.

3. The system as recited in claim 1, wherein the event is received from the first service with a source identifier, a detail-type identifier for a structure of one or more fields in the event, and a user identifier, wherein a source field in the message envelope is populated with the source identifier, wherein a detail-type field in the message envelope is populated with the detail-type identifier, and wherein a user field in the message envelope is populated with the user identifier.

4. The system as recited in claim 1, wherein, in filtering the message based at least in part on the message envelope, the messaging system is configured to:

determine a match between one or more of the field names and one or more of the field values in the message envelope and one or more corresponding field names and one or more corresponding field values in a rule pattern; and wherein the messaging system is further configured to:
initiate one or more actions associated with the rule pattern.

5. A computer-implemented method, comprising:

receiving a plurality of events generated by a plurality of services of a multi-tenant environment and describing status of respective computing resources in the multi-tenant environment, wherein the events comprise an event generated by a first service in the plurality of services and formatted using a content schema, and a different event generated by a second service in the plurality of services and formatted using a different content schema;

determining, from event metadata of the event received from the first service, a first account identifier associated with a first tenant in the multi-tenant environment, wherein the first tenant is assigned a first resource by the first service, wherein the event describes a status of the first resource;

generating a message comprising a message envelope and the event, wherein the message envelope comprises a plurality of field names and one or more field values formatted using an envelope schema, including the first account identifier;

determining, from different event metadata of the different event received from the second service, a second account identifier associated with a second tenant in the multi-tenant environment, wherein the second tenant is assigned a second resource by the second service, wherein the different event describes a status of the second resource;

generating a different message comprising a different message envelope and the different event, wherein the different message envelope comprises the plurality of field names and one or more different field values formatted using the envelope schema, including the second account identifier;

parsing the message envelope to determine the first account identifier and filtering the message based at least in part on the message envelope and the first account identifier;

parsing the different message envelope to determine the second account identifier and filtering the different message based at least in part on the different message envelope and the second account identifier; and delivering the message and different message based at least in part on the respective filtering of the message and the different message.

6. The method as recited in claim 5, wherein the one or more field values in the message envelope comprise an identification of the content schema.

7. The method as recited in claim 5, wherein the field values in the message envelope comprise a source identifier and a detail-type identifier that represent an identification of the content schema.

8. The method as recited in claim 5, wherein the event is received from the first service with a source identifier, a detail-type identifier for a structure of one or more fields in the event, and a user identifier, wherein a source field in the message envelope is populated with the source identifier, wherein a detail-type field in the message envelope is populated with the detail-type identifier, and wherein a user field in the message envelope is populated with the user identifier.

9. The method as recited in claim 5, wherein filtering the message based at least in part on the message envelope comprises:

determining a match between one or more of the field names and one or more of the field values in the message envelope and one or more corresponding field names and one or more corresponding field values in a rule pattern; and wherein the method further comprises:
initiating one or more actions associated with the rule pattern.

10. The method as recited in claim 9, wherein the one or more field values in the message envelope that match the one or more corresponding field values in the rule pattern comprise one or more identifiers of resources in a provider network.

11. The method as recited in claim 5, wherein the plurality of field names in the envelope schema represent one or more mandatory fields and one or more optional fields.

12. The method as recited in claim 5, wherein the content schema comprises one or more fields in a hierarchical structure.

13. A non-transitory computer-readable storage medium storing program instructions computer-executable to perform:

receiving a plurality of events from a plurality of services of a multi-tenant environment that hosts computing resources for different tenants, wherein the events describe status of different ones of the computing resources and are received by an envelope service via an application programming interface (API), wherein the events describe resources associated with the services, and wherein the events comprise an event generated by a first service in the plurality of services and formatted using a content schema, and a different event generated by a second service in the plurality of services and formatted using a different content schema;

determining, from event metadata of the event received from the first service, a first account identifier associated with a first resource in the first service, wherein the event describes a status of the first resource;

generating a message comprising a message envelope and the event, wherein the message envelope comprises a plurality of field names and one or more field values formatted using an envelope schema, including the first account identifier;

determining, from different event metadata of the different event received from the second service, a second account identifier associated with a second resource in the second service, wherein the different event describes a status of the second resource;

generating a different message comprising a different message envelope and the different event, wherein the different message envelope comprises the plurality of field names and one or more different field values formatted using the envelope schema, including a second account identifier;

parsing the message envelope to determine the first account identifier;

parsing the different message envelope to determine the second account identifier; and sending the message and the different message to one or more recipients based at least in part on their respective message envelopes and a respective one of the first and second account identifiers determined from the parsing of their respective message envelopes.

14. The non-transitory computer-readable storage medium as recited in claim 13, wherein the one or more field values in the message envelope comprise an identification of the content schema.

15. The non-transitory computer-readable storage medium as recited in claim 13, wherein the field values in the message envelope comprise a source identifier and a detail-type identifier that represent an identification of the content schema.

16. The non-transitory computer-readable storage medium as recited in claim 13, wherein the event is received from the first service with a source identifier, a detail-type identifier for a structure of one or more fields in the event, and a user identifier, wherein a source field in the message envelope is populated with the source identifier, wherein a detail-type field in the message envelope is populated with the detail-type identifier, and wherein a user field in the message envelope is populated with the user identifier.

17. The non-transitory computer-readable storage medium as recited in claim 13, wherein the program instructions are further computer-executable to perform:

determining a match between one or more of the field names and one or more of the field values in the message envelope and one or more corresponding field names and one or more corresponding field values in a rule pattern; and initiating one or more actions associated with the rule pattern.

18. The non-transitory computer-readable storage medium as recited in claim 17, wherein the one or more field values in the message envelope that match the one or more corresponding field values in the rule pattern comprise one or more identifiers of resources.

19. The non-transitory computer-readable storage medium as recited in claim 13, wherein the plurality of field names in the envelope schema represent one or more mandatory fields and one or more optional fields.

20. The non-transitory computer-readable storage medium as recited in claim 13, wherein the content schema comprises one or more fields in a hierarchical structure.

* * * * *